US008510807B1

(12) United States Patent
Elazary et al.

(10) Patent No.: US 8,510,807 B1
(45) Date of Patent: Aug. 13, 2013

(54) REAL-TIME GRANULAR STATISTICAL REPORTING FOR DISTRIBUTED PLATFORMS

(75) Inventors: Lior Elazary, Agoura Hills, CA (US); Robert J. Peters, Santa Monica, CA (US); Seungyeob Choi, Northridge, CA (US)

(73) Assignee: Edgecast Networks, Inc., Santa Monica, CA (US)

( * ) Notice: Subject to any disclaimer, the term of this patent is extended or adjusted under 35 U.S.C. 154(b) by 84 days.

(21) Appl. No.: 13/217,924

(22) Filed: Aug. 25, 2011

Related U.S. Application Data

(60) Provisional application No. 61/524,294, filed on Aug. 16, 2011.

(51) Int. Cl.
*G06F 7/04* (2006.01)
*G06F 15/16* (2006.01)
*G06F 17/30* (2006.01)
*G06F 21/62* (2013.01)
*H04L 29/06* (2006.01)

(52) U.S. Cl.
CPC .......... *G06F 21/6218* (2013.01); *H04L 63/104* (2013.01)
USPC ................ 726/4; 709/217; 709/219; 709/224

(58) Field of Classification Search
None
See application file for complete search history.

(56) References Cited

U.S. PATENT DOCUMENTS

| 6,725,263 | B1 | 4/2004 | Torres | |
|---|---|---|---|---|
| 6,857,012 | B2* | 2/2005 | Sim et al. | 709/222 |
| 6,895,431 | B1* | 5/2005 | Bero | 709/220 |
| 6,975,963 | B2* | 12/2005 | Hamilton et al. | 702/182 |
| 7,117,262 | B2 | 10/2006 | Bai et al. | |
| 7,231,442 | B2 | 6/2007 | Chen | |
| 7,376,730 | B2* | 5/2008 | Pandya | 709/224 |

(Continued)

FOREIGN PATENT DOCUMENTS

KR      20030004473      *     1/2003

OTHER PUBLICATIONS

Falk, A Comprehensive and Flexible Security Concept for CDNs in Heterogeneous Environments, 14th IST Mobile & Wireless Communications Summit, Dresden, Germany, Jun. 19-23, 2005, 5 pages.*

(Continued)

*Primary Examiner* — Andrew L Nalven
*Assistant Examiner* — Walter Malinowski
(74) *Attorney, Agent, or Firm* — Los Angeles Patent Group; Arman Katiraei

(57) ABSTRACT

Some embodiments provide a reporting system for improved granular real-time performance statistics reporting in a distributed platform. The reporting system includes a statistic server and a portal. The statistics server is communicably coupled to servers of the distributed platform that produce statistical data related to the distribution of content and execution of services for different customers. The statistics server aggregates the statistical data from the plurality of servers in an optimized staggered manner during a recurring interval. This reduces the amount of statistical data that is passed at any particular instance in time from the servers the statistics servers. The statistics server incrementally updates a real-time performance report for a particular customer as the statistical data is aggregated for the particular customer so that the computational and memory overhead for deriving the performance report in real-time is reduce. The portal then presents the performance report to the particular customer.

21 Claims, 15 Drawing Sheets

(56) References Cited

U.S. PATENT DOCUMENTS

| | | | |
|---|---|---|---|
| 7,657,622 B1 | 2/2010 | Douglis et al. | |
| 7,765,304 B2* | 7/2010 | Davis et al. | 709/227 |
| 8,117,276 B1* | 2/2012 | Sakata et al. | 709/214 |
| 8,180,896 B2* | 5/2012 | Sakata et al. | 709/226 |
| 8,332,529 B1* | 12/2012 | Shetty | 709/231 |
| 8,412,764 B1* | 4/2013 | Liskov et al. | 709/201 |
| 2002/0156552 A1* | 10/2002 | Whiting | 700/300 |
| 2002/0177910 A1 | 11/2002 | Quarterman et al. | |
| 2003/0149581 A1 | 8/2003 | Chaudhri et al. | |
| 2003/0236905 A1* | 12/2003 | Choi et al. | 709/231 |
| 2003/0237016 A1* | 12/2003 | Johnson et al. | 714/4 |
| 2004/0143683 A1* | 7/2004 | Greenwood | 709/250 |
| 2006/0072556 A1* | 4/2006 | Garrett | 370/352 |
| 2007/0220515 A1* | 9/2007 | Dewitt et al. | 718/100 |
| 2007/0233884 A1* | 10/2007 | Farber et al. | 709/229 |
| 2008/0010375 A1* | 1/2008 | Coleman et al. | 709/225 |
| 2008/0263180 A1* | 10/2008 | Hurst et al. | 709/219 |
| 2009/0204646 A1* | 8/2009 | Park | 707/203 |
| 2009/0254993 A1* | 10/2009 | Leone | 726/25 |
| 2010/0296409 A1* | 11/2010 | Fok et al. | 370/252 |
| 2010/0315979 A1* | 12/2010 | Surineni et al. | 370/310 |
| 2012/0084399 A1* | 4/2012 | Scharber et al. | 709/219 |
| 2012/0265725 A1* | 10/2012 | Werner | 707/600 |

OTHER PUBLICATIONS

Pathan, Content Delivery Networks: State of the Art, Insights, and Imperatives, Springer-Verlag Berlin Heidelberg, 2008, pp. 3-32.*

* cited by examiner

Table 1 (510): PS table for Customer 1234

| PS table for Customer 1234 | ES1 | ES4 | ES8 | ES11 | ES12 | ES14 | PR |
|---|---|---|---|---|---|---|---|
| Total Hits per Interval | 22 | 12 | 15 | 4 | 11 | 8 | 72 |
| 2xx per Interval | 21 | 12 |  | 2 |  | 4 | 39 |
| 3xx per Interval |  |  |  |  |  |  |  |
| 4xx per Interval |  |  |  |  |  |  |  |
| 5xx per Interval |  |  |  |  |  |  |  |
| HTTP Bandwidth |  |  |  |  |  |  |  |
| HTTP Connections |  |  |  |  |  |  |  |
| FMS Bandwidth |  |  |  |  |  |  |  |
| FMS Connections |  |  |  |  |  |  |  |
| WMS Bandwidth |  |  |  |  |  |  |  |
| WMS Connections |  |  |  |  |  |  |  |
| 1234/stream1.flv Bandwidth | 3 |  |  |  |  |  |  |
| 1234/stream1.flv Connections |  |  |  |  |  |  |  |
| 1234/streamX.flv Bandwidth | 3 |  |  |  |  |  |  |
| 1234/streamX.flv Connections |  |  |  |  |  |  |  |

Table 2 (520): PS table for Customer 1235

| PS table for Customer 1235 | ES2 | ES4 | ES5 | ES7 | ES12 | PR |
|---|---|---|---|---|---|---|
| Total Hits per Interval | 43 | 24 | 41 | 55 | 35 | 198 |
| 2xx per Interval | 42 | 20 | 34 | 42 | 31 | 169 |
| 3xx per Interval |  | 1 |  | 2 | 3 | 6 |
| 4xx per Interval |  |  |  |  |  |  |
| 5xx per Interval |  |  |  |  |  |  |

Table 3 (530): PS table for Customer 4321

| PS table for Customer 4321 | ES1 | ES3 | ES4 | ES6 | PR |
|---|---|---|---|---|---|
| Total Hits per Interval | 8 | 3 | 4 | 7 | 22 |
| 2xx per Interval | 2 | 1 | 3 | 6 | 12 |
| 3xx per Interval | 1 |  |  |  | 1 |
| 4xx per Interval | 1 | 1 |  |  | 2 |
| 5xx per Interval |  | 1 |  |  | 1 |
| HTTP Bandwidth | 2MB/s |  |  | 6MB/s | 8MB/s |
| HTTP Connections | 3 |  |  | 8 | 11 |
| FMS Bandwidth |  | 7MB/s |  |  | 7MB/s |
| FMS Connections |  | 6 |  |  | 6 |
| WMS Bandwidth | 2MB/s |  | 3MB/s | 3MB/s | 8MB/s |
| WMS Connections | 2 |  | 2 | 4 | 8 |
| 4321/stream1.flv Bandwidth | 1 MB/s |  | 1 MB/s | 2 MB/s | 4 MB/s |
| 4321/stream1.flv Connections | 1 |  | 1 | 3 | 5 |
| 4321/stream1.flv Bandwidth |  | 7 MB/s |  |  | 7 MB/s |
| 4321/stream1.flv Connections |  | 6 |  |  | 6 |

Figure 5

REAL-TIME GRANULAR STATISTICAL REPORTING FOR DISTRIBUTED PLATFORMS

CLAIM OF BENEFIT TO RELATED APPLICATIONS

This application claims the benefit of U.S. provisional application 61/524,294, entitled "Open Content Delivery Network Platform with Capacity Exchange", filed Aug. 16, 2011. The contents of Provisional Application 61/524,294 are hereby incorporated by reference.

TECHNICAL FIELD

The present invention relates to the reporting of statistics in distributed platforms including content delivery networks.

BACKGROUND ART

Content delivery networks (CDNs) have greatly improved the way content is transferred across data networks such as the Internet. A CDN accelerates the delivery of content by reducing the distance that content travels in order to reach a destination. To do so, the CDN strategically locates surrogate origin servers, also referred to as caching servers or edge servers, at various points-of-presence (POPs) that are geographically proximate to large numbers of content consumers and the CDN utilizes a traffic management system to route requests for content hosted by the CDN to the edge server that can optimally deliver the requested content to the content consumer. Determination of the optimal edge server may be based on geographic proximity to the content consumer as well as other factors such as load, capacity, and responsiveness of the edge servers. The optimal edge server delivers the requested content to the content consumer in a manner that is more efficient than when origin servers of the content publisher deliver the requested content. For example, a CDN may locate edge servers in Los Angeles, Dallas, and New York. These edge servers may cache content that is published by a particular content publisher with an origin server in Miami. When a content consumer in San Francisco submits a request for the published content, the CDN will deliver the content from the Los Angeles edge server on behalf of the content publisher as opposed to the much greater distance that would be required when delivering the content from the origin server in Miami. In this manner, the CDN reduces the latency, jitter, and amount of buffering that is experienced by the content consumer. The CDN also allows the content publisher to offload infrastructure, configuration, and maintenance costs while still having the ability to rapidly scale resources as needed. Content publishers can therefore devote more time to the creation of content and less time to the creation of an infrastructure that delivers the created content to the content consumers.

As a result of these and other benefits, many different CDNs are in operation today. Edgecast, Akamai, Limelight, and CDNetworks are some examples of operating CDNs that are responsible for the delivery of terabytes worth of content. FIG. 1 illustrates a representative infrastructure for some CDNs. As shown in FIG. 1, the infrastructure includes a distributed set of edge servers 110, traffic management servers 120, and an administrative server 130. The figure also illustrates the interactions that CDN customers including content publishers have with the CDN and interactions that content consumers or end users have with the CDN.

Each edge server of the set of edge servers 110 may represent a single physical machine or a cluster of machines. The cluster of machines may include a server farm for a geographically proximate set of physically separate machines or a set of virtual machines that execute over partitioned sets of resources of one or more physically separate machines. The set of edge servers 110 are distributed across different edge regions of the Internet to facilitate the "last mile" delivery of content. The edge servers run various processes that (1) manage what content is cached, (2) how content is cached, (3) how content is retrieved from the origin server when the content is not present in cache, (4) monitor server capacity (e.g., available processor cycles, available memory, available storage, etc.), (5) monitor network performance (e.g., latency, downed links, etc.), and (6) report statistical data on the delivered content. The set of edge servers 110 may provide the monitoring information to the traffic management servers 120 to facilitate the routing of content consumers to the optimal edge servers. The set of edge servers 110 may provide the statistical data to the administrative server 130 where the data is aggregated and processed to produce performance reports for the delivery of the customers' content.

The traffic management servers 120 route content consumers, and more specifically, content consumer issued requests for content to the one or more edge servers. Different CDN implementations utilize different traffic management schemes to achieve such routing to the optimal edge servers. Consequently, the traffic management servers 120 can include different combinations of Doman Name System (DNS) servers, load balancers, and routers performing Anycast or Border Gateway Protocol (BGP) routing. For example, some CDNs utilize the traffic management servers 120 to provide a two-tiered DNS routing scheme, wherein the first DNS tier resolves a DNS request to the CDN region (or POP) that is closest to the requesting content consumer and the second DNS tier resolves the DNS request to the optimal edge server in the closest CDN region. As another example, some CDNs use Anycast routing to identify the optimal edge server.

The administrative server 130 may include a central server of the CDN or a distributed set of interoperating servers that perform the configuration control and reporting functionality of the CDN. Content publishers register with the administrative server 130 in order to access services and functionality of the CDN. Accordingly, content publishers are also referred to as customers of the CDN. Once registered, customers can interface with the administrative server 130 to specify a configuration and view performance reports.

Specifying a configuration involves identifying the content that is to be delivered by the CDN, the amount of CDN resources to provision, the type of CDN resources to provision, the geographic regions where the CDN resources are to be provisioned, and the caching policies for the provisioned resources as some examples.

The performance reports are an essential feature of any CDN as they provide customers (i.e., content publishers) with insight as to how their configurations are performing across the CDN. The usefulness of these reports depends on their granularity and their freshness.

Granularity relates to the specificity of the performance reports. Less granular reports are useful in providing an overall view of the customer's configuration across the CDN. More granular reports are useful in providing a detailed view as to particular performance aspects of the customer's configuration.

Freshness relates to the temporal validity of the statistical data that is reported. In other words, freshness relates to the delay with which the statistical data is retrieved and processed before being reported to the customers. The closer to real-time the statistical data is reported, the sooner a customer or administrator can take action to address issues such as unexpected configuration errors, demand surges, network failures, or equipment failures.

However, existing reporting systems and methods are resource intensive and suffer from scalability issues. Specifically, many current systems and methods utilize a statistics server as a central hub for the aggregation and processing of statistical data from the edge servers 110 and for the distribution of the resulting performance reports to the customers. This is because the statistical data for a particular customer's configuration can be distributed across many edge servers and that statistical data must first be centralized before it can be processed to produce the performance reports. Therefore, the statistics server requires sufficient computational and memory/storage resources to (1) aggregate and store the statistical data from each of the edge servers in real-time, (2) process the aggregated statistical data to produce the performance reports for each customer of the CDN, and (3) disseminate the performance reports to the customers in an on-demand basis.

As the aggregated data becomes more granular or the real-time refresh rate increases, the amount of statistical data being passed from the edge servers 110 to the statistics server increases. This results in increased resource consumption at both the edge servers 110 and the statistics server. However, there is a greater impact on the statistics server than on the edge servers 110. For example, an increase in granularity that results in twice the amount of statistical data being reported from an edge server is magnified at the statistics server according to the number of edge servers that provide statistical data to the statistics server. Specifically, if each of four edge servers provides 1 MB of statistical data to the statistics server at periodic intervals, then the statistics server receives 4 MB of statistical data at each interval. If the granularity for the provided statistical data changes such that each edge server of the four edge servers reports 2 MB of data at each interval, then the statistics server receives 8 MB of data at each interval.

Moreover, the front-end demand for the presentation of the performance reports also consumes resources of the statistics server. As more customers request to view the performance reports, there is greater demand placed on the resources of the statistics server. When historic statistics are also reported, the statistics server is required to additionally store past statistical data in addition to the real-time statistical data. Consequently, the resources of the statistics server can be quickly over utilized.

While deploying a set of statistics servers can offload some of the load that would otherwise be placed on a single statistics server, such deployment does not ameliorate the large quantities of statistical data that is passed within the CDN. In fact, such deployment may exacerbate the situation when the statistical data has to be replicated to each statistics server in the set of statistics servers. Furthermore, the deployment does not ameliorate the overall amount of processing performed by the set of statistics servers and the deployment adds infrastructure costs for each newly deployed statistics server.

Accordingly, there is a need for improved systems and methods with which to perform granular real-time reporting within a distributed platform such as a CDN. Specifically, there is a need to reduce the amount of statistical data that is passed between the edge servers and the one or more statistics servers at a particular instance in time without degrading the ability (1) to report in real-time and (2) to report granular statistical data. There is also a need to reduce the memory, storage, and computational load on the one or more statistics servers such that the statistics servers can support reporting for larger numbers of customers, more granular statistical data, increased real-time refresh rates, and more edge servers without the need for additional resources. There is further a need to reduce the load on the one more statistics servers so that the servers can provide performance reports to a larger number of customers.

SUMMARY OF THE INVENTION

It is an object of the present invention to define systems and methods for improved and efficient reporting of granular real-time performance statistics in a distributed platform such as a content delivery network (CDN). It is further an object to provide such granular real-time reporting while reducing the amount of statistical data that is passed at any particular instance in time from a set of edge servers to one or more statistics servers. It is further an object to reduce the resources that are needed to produce performance reports from the aggregated statistical data such that the statistics servers can support (1) aggregating and reporting for larger numbers of customers, (2) more granular statistical data, (3) increased real-time refresh rates, and (4) more edge servers that produce statistical data.

To achieve these and other objects, some embodiments provide systems and methods for improved granular real-time performance statistics reporting, hereinafter collectively referred to as the reporting system. In some embodiments, the reporting system comprises a statistics server, portal, and database. The reporting system is integrated at various levels in a distributed platform. The distributed platform can include a CDN, multiple interoperating CDNs in an Open CDN platform, or other cloud service providers. The reporting system of some embodiments can seamlessly integrate with the various distributed platforms and provide real-time granular statistical reporting, wherein the real-time granular statistical reporting details the performance realized for each customer across the distributed platform irrespective of whether the customer's configuration(s) is deployed to one or more edge servers that are operated by one or more CDNs.

In some embodiments, the statistics server aggregates statistical data from a set of edge servers of the distributed platform. This includes aggregating statistical data from edge servers of different CDNs, wherein an edge server of two different CDNs can produce statistical data for the same customer configuration that is deployed to both such edge servers. Additionally, this includes aggregating statistical data for multiple customer configurations that are deployed to the same edge server. In some embodiments, the statistics server reduces the amount of statistical data that is aggregated at any given instance in time by aggregating the data from the set of edge servers in an optimized staggered manner. Specifically, the statistics server aggregates statistical data from a different subset of the set of edge servers at different time windows within a recurring time interval. As a result, the statistical data is still aggregated in real-time, but in a manner in which the resources of the statistics server are proportionally utilized over the time interval. To further leverage the existing resources of the statistics server, some embodiments provide a dynamic data structure with which the statistical data is reported to the statistics server. Specifically, the data structure reported by a particular edge server is dynamically populated with different sets of statistical data based on different relevant performance statistics that the particular edge server produces during each recurring reporting interval.

The statistics server processes the statistical data in the aggregated data structures as they are received in the staggered manner. In some embodiments, processing includes updating performance statistics tables with statistical data that is parsed from the aggregated data structures. In some embodiments, the performance statistics tables store real-time values for different performance statistics reported by the edge servers. As the statistical data from different edge servers arrive in the staggered manner, the statistics server incrementally and in real-time updates the stored values in the performance statistics table and with each update, the statistics server updates derived values for the performance reports. In this manner, derived values for the performance reports are never stale and computational and memory overhead for the statistics server is reduced.

In some embodiments, the portal is communicably coupled to one or more statistics servers and the portal provides the interface through which users (e.g., system administrators and customers of the distributed platform) are able to view performance reports for their deployed configurations. In some embodiments, the portal offloads the storage and processing overhead for producing historical performance reporting to the user client. To do so, the portal maintains a session between the statistics server and the user client. As the derived values for the statistics are updated in real-time at the statistics server, the portals forwards the updated derived values to the user client. The user client constructs a historical trend of statistical data by storing each real-time update as a separate value in local memory. Consequently, the storing and presentation of historical statistical trend data is offloaded from the statistics server to the user client, thereby reducing the resource overhead at the statistics server. In some embodiments, the portal is communicably coupled to the database of the reporting system. The portal utilizes the database to authenticate users and identify which performance reports the users are authorized to view.

BRIEF DESCRIPTION OF THE DRAWINGS

In order to achieve a better understanding of the nature of the present invention, a preferred embodiment for the reporting system will now be described, by way of example only, with reference to the accompanying drawings in which:

FIG. 5 conceptually illustrates a set of performance statistics tables in accordance with some embodiments.

DETAILED DESCRIPTION

In the following detailed description, numerous details, examples, and embodiments of the reporting system is set forth and described. As one skilled in the art would understand in light of the present description, the reporting system is not limited to the embodiments set forth, and the reporting system may be practiced without some of the specific details and examples discussed. Also, reference is made to the accompanying figures, which illustrate specific embodiments in which the reporting system can be practiced. It is to be understood that other embodiments can be used and structural changes can be made without departing from the scope of the embodiments herein described.

I. Real-Time Granular Reporting System

Distributed platforms provide cost effective means for content publishers to efficiently distribute their content to large numbers of content consumers over the Internet and other data networks. As the global footprint of these distributed platforms grows with larger edge server deployments across distinct geographic regions, there is a need for improved systems and methods with which to report the performance statistics from these distributed platforms. Specifically, there is a need for systems and methods that can generate performance statistics in different real-time refresh rates and on different granular bases for large numbers of customers whose configurations are deployed across large numbers of edge servers. Resources of existing reporting systems and methods can quickly be overwhelmed by the vast amount of statistical data that is generated as a result of having to support any one or more of: (1) increased real-time refresh rates, (2) increased granularity in reporting, (3) increased number of supported customers, and (4) increased number of edge servers in the distributed platform that produce the statistical data.

For these reasons, some embodiments provide a reporting system for improved and efficient reporting of granular real-time performance statistics in a distributed platform such as a content delivery network (CDN). Other distributed platforms with which the reporting system can operate include an Open CDN platform and platforms of various cloud service providers such as Amazon CloudFront, Amazon EC2, AT&T, and Servepath. The Open CDN platform is discussed below in Section II. A more detailed discussion of the Open CDN platform is provided in United States provisional patent application entitled "Open Content Delivery Network Platform with Capacity Exchange", filed on Aug. 16, 2011 with assigned Ser. No. 61/524,294.

Figure 1:
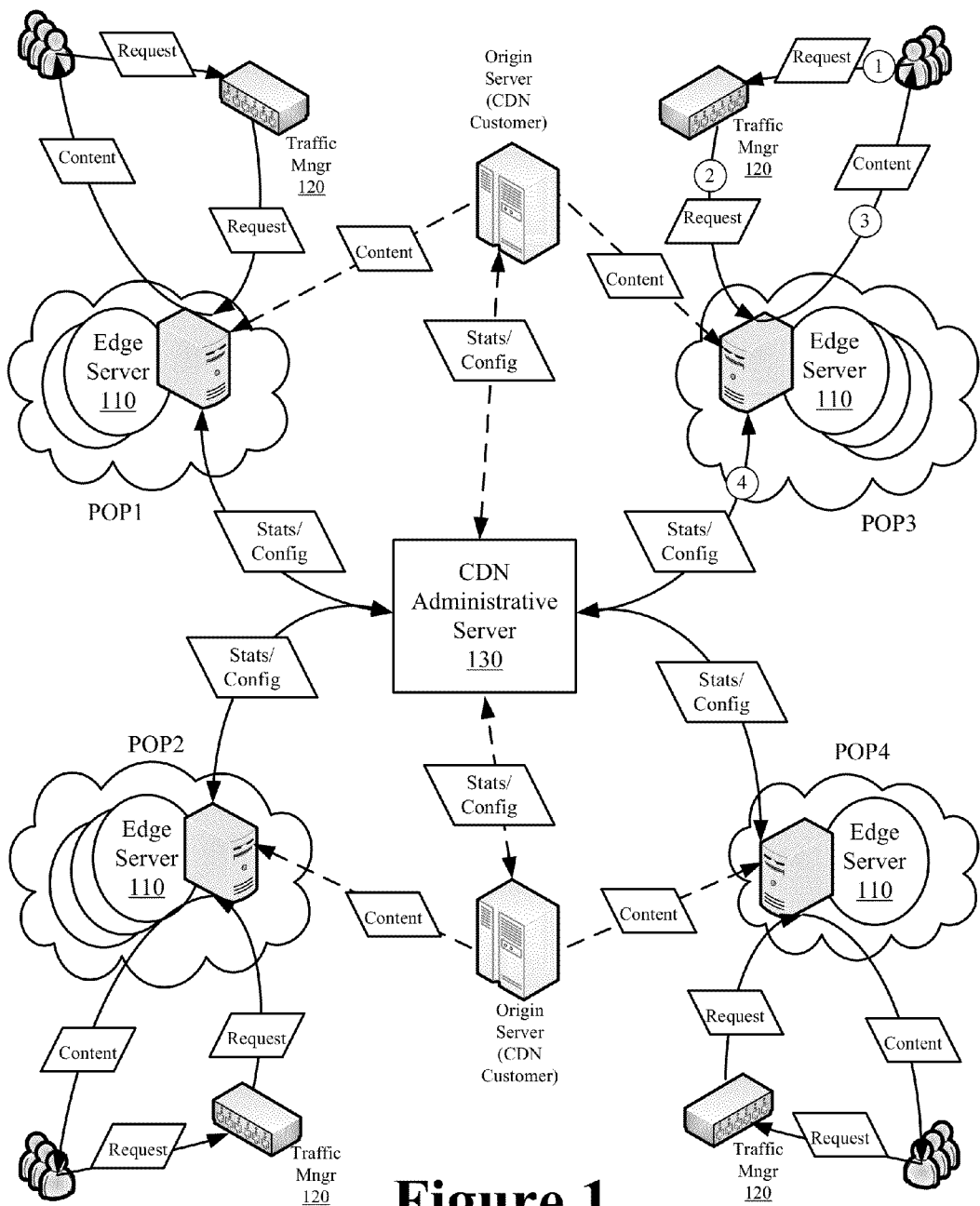
FIG. 1 illustrates a representative infrastructure for some CDNs.
Figure 2:
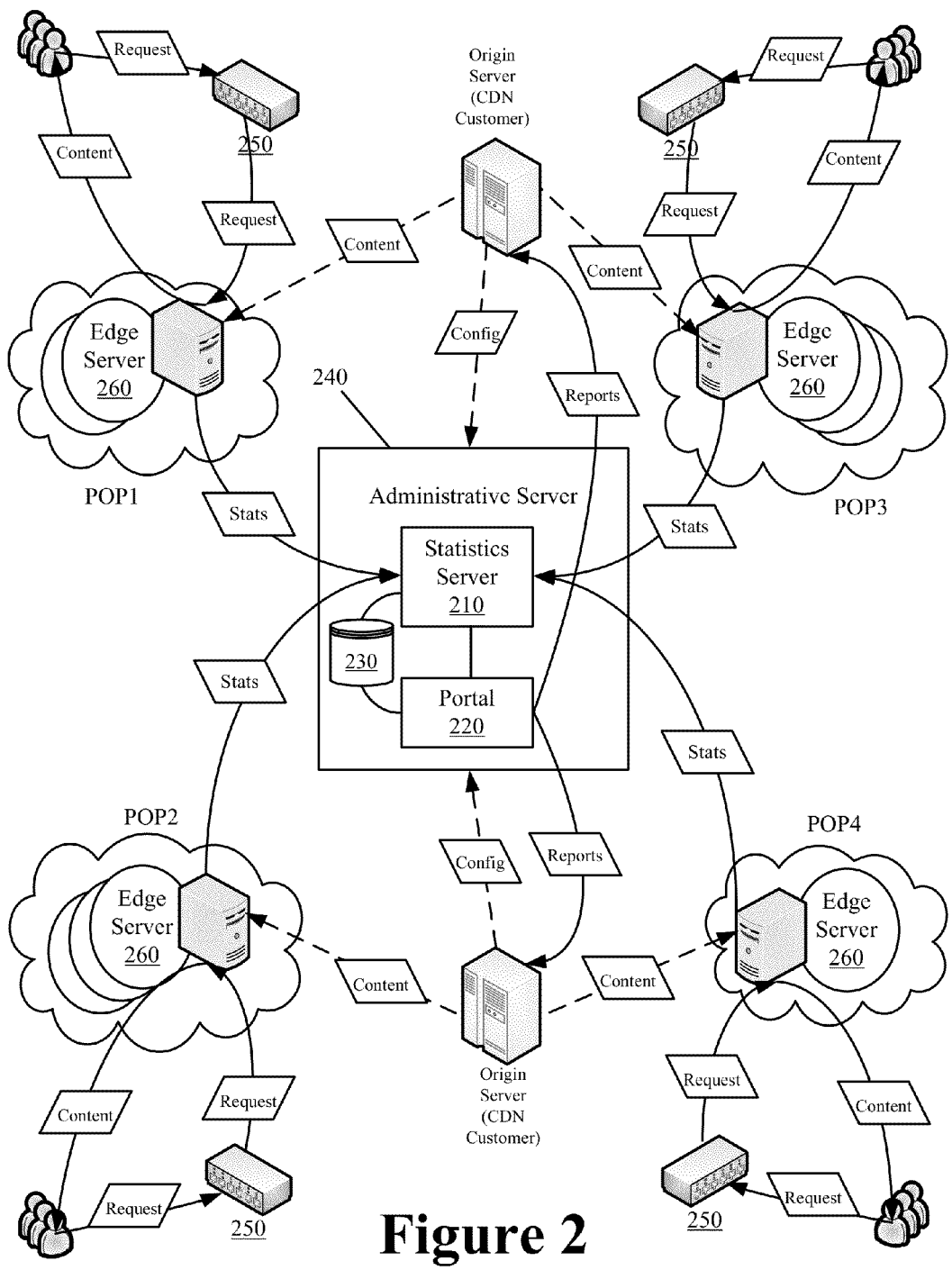
FIG. 2 presents the various components of the reporting system in accordance with some embodiments.

FIG. 2 presents the various components of the reporting system in accordance with some embodiments. The reporting system includes statistics server 210, portal 220, and database 230. In this figure, the reporting system is integrated within an existing CDN infrastructure that includes administrative server 240, traffic management servers 250, and edge servers 260. Specifically, the reporting system is integrated as part of the administrative server 240, wherein the administrative server 240 performs the reporting functionality for the CDN. In some embodiments, the reporting system is a standalone system that operates independent of the administrative server 240. This is especially the case when the distributed platform does not have an administrative server 240 or the administrative server 240 performs functionality that is inconsistent with the definition of the administrative server 240 provided herein.

Though a single statistics server 210, portal 220, and database 230 are shown in FIG. 2, it should be apparent that each of these components 210-230 may be representative of one or more servers that are separate physical machines collocated at a single geographic location, separate physical machines at different distributed locations, or virtual machines that operate using partitioned resources of one or more physical servers. Furthermore, the reporting system may include other components in addition to or instead of the statistics server 210, portal 220, and database 230 and that the functionality of the statistics server 210, portal 220, and database 230 need not be implemented by physically separate devices or functionally distinct components.

As used hereafter, statistical data comprises the different performance statistics that an edge server quantitatively measures and produces values for when delivering content or when executing some service on behalf of each customer or each customer configuration that is deployed to that edge server. A performance report compiles the statistical data for a particular customer or a particular customer configuration of the distributed platform based on statistical data that is aggregated from a set of edge servers that are involved in delivering content or executing some service on behalf of that particular customer or that particular customer configuration. In some embodiments, the performance report includes one or more values that are derived from the compiled set of statistical data. Each derived value identifies the performance realized by the set of edge servers for a different performance statistic. The performance report including the compiled set of statistical data and derived values is updated in real-time. In some embodiments, the performance report is interactive such that different granular levels of specificity can be presented for the different performance statistics.

Table 1 presents some of the performance metrics that an edge server quantitatively measures and produces values for when delivering content or executing some service on behalf of a particular customer or customer configuration:

TABLE 1

| STATISTIC | DESCRIPTION |
|---|---|
| Current Bandwidth | The current bandwidth in use on a specified platform (e.g., HTTP large object, HTTP small object, application delivery network (ADN), flash media server (FMS), windows media services (WMS). |
| Bandwidth Over Time | Displays the amount of bandwidth used for a specified platform. |
| Connections Over Time | The number of connections that have been established for a specified platform. |
| Purge/Load | Indicates how many purge and load requests are currently in queue to be processed. |
| Storage | Displays how much storage space is being used on the CDN origin server. |
| Total Hits per second | The total number of requests per second for the current platform. |
| 2xx per second | The total number of 2xx status codes (e.g., 200, 201, 202, etc.) that occur per second for the current platform. This type of status code indicates that the request was successfully delivered to the client. |
| 304 per second | The total number of 304 status codes that occur per second for the current platform. This status code indicates that the requested asset has not been modified, since it was last retrieved by the HTTP client. |
| 3xx per second | The total number of 3xx status codes (e.g., 300, 301, 302, etc.) that occur per second for the current platform. This type of status code indicates that the request resulted in a redirection. |
| 403 per second | The total number of 403 status codes that occur per second for the current platform. This status code indicates that the request was deemed unauthorized. |
| 404 per second | The total number of 404 status codes that occur per second for the current platform. This status code indicates that the requested asset could not be found. |
| 4xx per second | The total number of 4xx status codes (e.g., 400, 401, 402, 405, etc.) that occur per second for the current platform. This status code indicates that the requested asset was not delivered to the client. |
| 5xx per second | The total number of 5xx status codes (e.g., 500, 501, 502, etc.) that occur per second for the current platform. |
| Total Hits per second | The total number of requests per second for the current platform. Used as a baseline indicator to see the percentage of total hits that a particular cache status comprises. |
| TCP_HIT per second | The total number of requests per second that result in a TCP_HIT. A TCP_HIT occurs when a cached asset is served from a POP to the client. |
| TCP_EXPIRED_HIT per second | The total number of requests per second that result in a TCP_EXPIRED_HIT. A TCP_EXPIRED_HIT occurs when an expired cached asset is served from the POP to the client. An expired cached asset (i.e. an asset whose max-age has been exceeded) is served when the origin server indicates that a newer version of the asset does not exist. |
| TCP_MISS per second | The total number of requests per second that result in a TCP_MISS. A TCP_MISS occurs when the requested asset was not found on the POP closest to the client. The asset will be requested from the origin server and then served to the client. |
| TCP_EXPIRED_MISS per second | The total number of requests per second that result in a TCP_EXPIRED_MISS. A TCP_EXPIRED_MISS occurs when a newer version of an expired cached asset is served from the POP to the client. If a cached asset has expired (i.e. an asset whose max-age has been exceeded), then a check will be performed on the origin server for a newer version of that asset. If an updated version is found, then it will be served to the client instead of the cached version. |
| TCP_CLIENT_REFRESH_MISS per second | The total number of requests per second that result in a TCP_CLIENT_REFRESH_MISS. A TCP_CLIENT_REFRESH_MISS occurs when an HTTP client (e.g. browser) forces an edge server to retrieve a new version of a stale asset from the origin server. |
| NONE per second | The total number of requests per second that result in no cache status. |
| CONFIG_NOCACHE per second | The total number of requests per second that result in a CONFIG_NOCACHE. A CONFIG_NOCACHE occurs when an asset's Cache-Control and Expires headers indicate that it should not be cached on a POP or by the HTTP client. |
| UNCACHEABLE per second | The total number of requests per second that result in an UNCACHEABLE. UNCACHEABLE occurs when a request results in an error (e.g., 403 Forbidden, 404 Not Found, etc.). |
| Per stream number of connections | The real-time total number of connections for a particular stream (WMS stream and FMS stream). |
| Per stream bandwidth | The real-time amount of bandwidth consumed by a particular stream (WMS stream and FMS stream). For example: |

| Stream Name | Type | B/W | Conns |
|---|---|---|---|
| 202000/_cust1/stream1.flv | Live | 2.83 Mbps | 13 |
| 202000/_cust2/streamZ.flv | On-Demand | 205.44 Kbps | 2 |
| 802000/originstream.com | Live | 1 Mbps | 5 |

A. Statistics Server

The statistics server 210 is tasked with aggregating statistical data from the edge servers of a distributed platform and with processing the aggregated statistical data to derive granular performance reports that are updated in real-time. In some embodiments, the statistics server 210 aggregates statistical data from edge servers of different CDNs, wherein an edge server of two different CDNs can produce statistical data for the same customer configuration that is deployed to both such edge servers. Additionally in some embodiments, the statistics server aggregates statistical data for multiple customer configurations that are deployed to the same edge server.

To increase the efficiency and scalability of the statistics server 210 without increasing the resource utilization of the statistics server 210, some embodiments implement various optimizations in the data aggregation procedure. Some such optimizations include staggered data aggregation and dynamic reporting of statistical data. Additionally, some embodiments optimize the manner in which the performance reports are derived by minimizing the processing and memory overhead for deriving and updating the performance reports in real-time. Consequently, the statistics server 210 can in real-time derive performance reports for a larger number of customers and for more granular data than is possible with statistics servers of existing reporting systems having the same set of resources.

Figure 3:
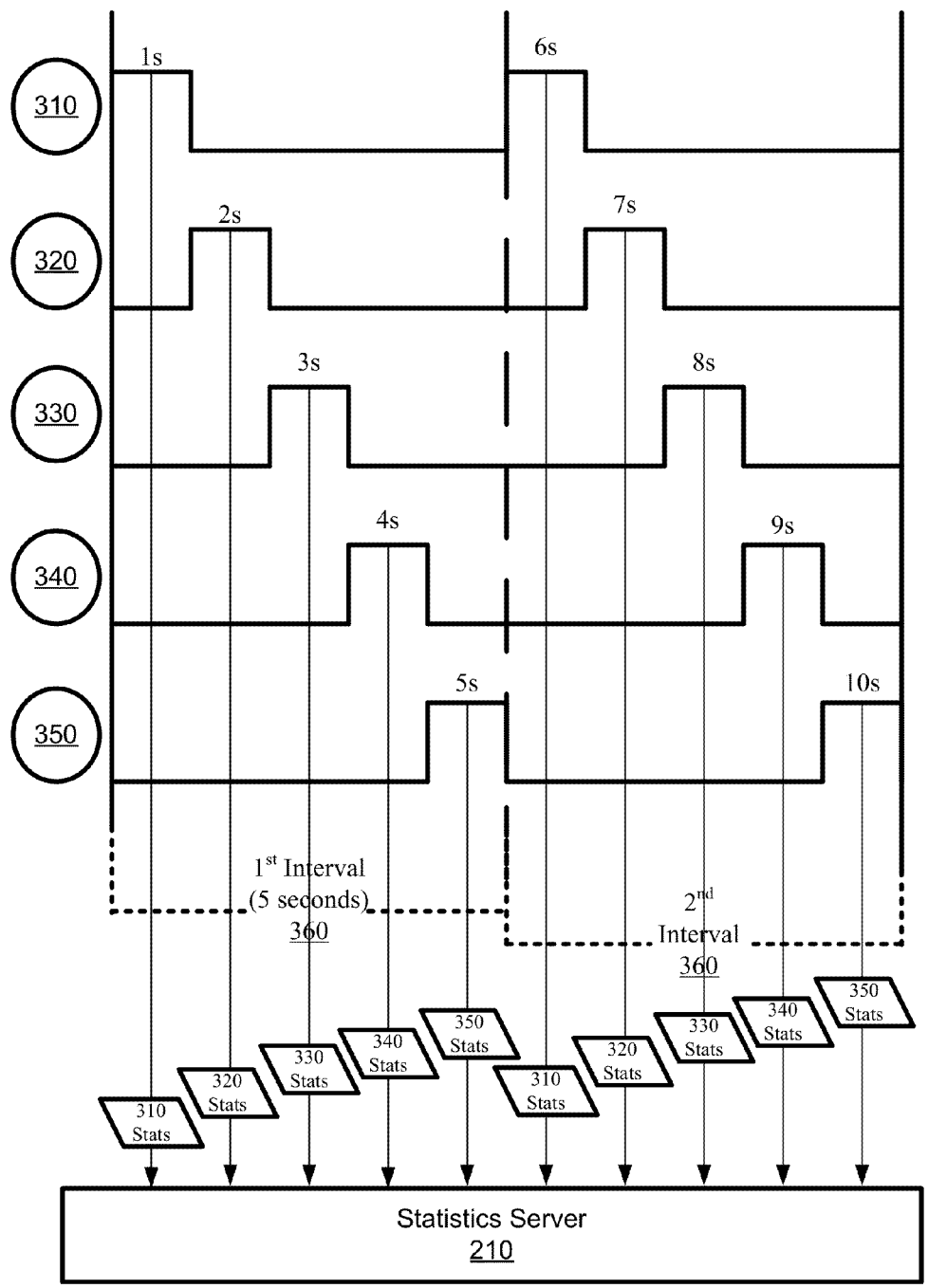
FIG. 3 presents a timing diagram to conceptually illustrate the optimized statistical data aggregation that is performed by the statistics server in accordance with some embodiments.

FIG. 3 presents a timing diagram to conceptually illustrate the optimized statistical data aggregation that is performed by the statistics server 210 in accordance with some embodiments. The statistics server 210 is communicably coupled to each of several edge servers 310, 320, 330, 340, and 350 of a distributed platform through one or more IP connections, TCP sessions, or other unsecure or secure network connections. In some embodiments, a configuration file identifies each of the edge servers 310-350 from which statistical data is to be aggregated. The configuration file specifies the protocols and addressing that the statistics server 210 uses to pull the statistical data from the edge servers 310-350 in the optimized manner further described below. In some embodiments, each of the edge servers 310-350 are configured with the protocols and addressing of the statistics server 210 such that the statistical data is pushed from each edge server 310-350 to the statistics server 210 in the optimized manner further described below. Based on the framework of the distributed platform, the edge servers 310-350 may include edge servers that are operated by a single CDNSP, two or more independent CDNSPs, or a cloud service provider.

To optimize the aggregation of the statistical data, the statistics server 210 aggregates the statistical data in a staggered manner. As shown in FIG. 3, the statistics server 210 aggregates statistical data from a different subset of the set of edge servers 310-350 at different time windows within a recurring time interval 360. For exemplary purposes, the recurring time interval 360 is defined to be a five second interval. Accordingly, the statistics server 210 aggregates the statistical data from each of the edge servers 310-350 every five seconds. However, the statistics server 210 aggregates the statistical data (1) from edge server 310 during the first second of the five second interval 360, (2) from edge server 320 during the second second of the five second interval 360, (3) from edge server 330 during the third second of the five second interval 360, (4) from edge server 340 during the fourth second of the five second interval 360, and (5) from edge server 350 during the fifth second of the five second interval 360.

It should be apparent to one of ordinary skill that the recurring time interval and the window within the time interval can be changed for more frequent refreshing of the real-time data or to accommodate aggregating the statistical data from a greater number of edge servers. Also, statistical data may be aggregated from two or more edge servers during the same window within the recurring time interval. For example, the statistics server 210 aggregates the statistical data from the edge servers 310-350 at three second intervals, wherein the statistics server 210 aggregates the statistical data (1) from edge servers 310 and 320 during the first second of the three second interval, (2) from edge servers 330 and 340 during the second second of the three second interval, and (3) from edge server 350 during the third second of the three second interval.

Based on this staggered aggregation, the resources of the statistics server 210 are evenly utilized over the recurring time interval. As a result, the edge servers 310-350 no longer compete against one another for resources of the statistics server 210 and each edge server 310-350 can pass greater amounts of data within its allotted time window than would otherwise be possible if all the edge servers 310-350 were continually passing data to the statistics server at the same time. The statistics server 210 can therefore support data aggregation with a greater number of edge servers, more granular data, and with increased real-time refresh rates without the need for expanding the resources of the statistics server 210. Moreover, the staggered aggregation affords greater freshness for the statistics in the performance reports. In other words, the staggered aggregation results in more accurate real-time statistics than those provided by other reporting system. Specifically, most other reporting systems wait until the completion of a recurring interval before updating real-time statistics that are presented to the customer. If the recurring interval is ten seconds, then the real-time statistics appearing in the customer's performance reports are updated every ten seconds. Also, some of the reported statistics can be up to ten seconds stale as a result of one or more edge servers reporting their data at the first second of the ten second interval and the reporting system waiting until the tenth second before reporting the statistics. Conversely, the staggered statistical data aggregation performed by the reporting system of the embodiments herein allows reporting to occur at a much more granular basis. Specifically, if a ten second recurring interval is used and statistical data from each of twenty edge servers is aggregated at every half second, then the real-time statistics appearing in the customer's performance reports can be updated every half second instead of waiting the full ten second interval as new statistical data is aggregated at the half second. Moreover, the freshness of the reported statistical data is consistently maintained throughout the recurring interval irrespective of when within the recurring interval the data is reported.

Figure 4:
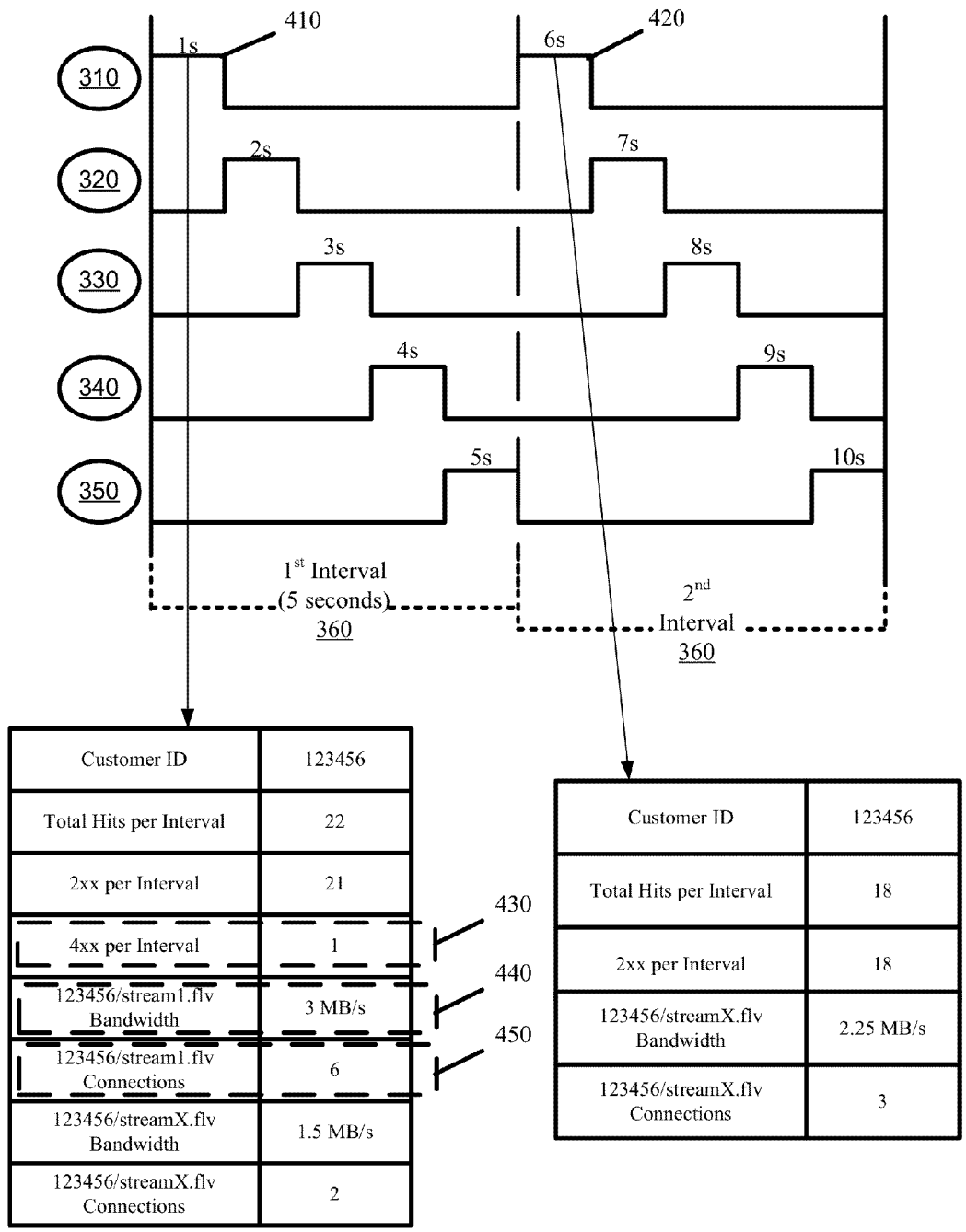
FIG. 4 conceptually illustrates two dynamic data structures that the statistics server aggregates from a particular edge server at two different instances in time.

In some embodiments, the edge servers pass the statistical data in dynamic data structures to further optimize the aggregation of the statistical data. FIG. 4 conceptually illustrates two dynamic data structures 410 and 420 that the statistics server aggregates from a particular edge server at two different instances in time. Data structure 410 is aggregated first (i.e., during a first instance of a particular time interval) and data structure 420 is aggregated second (i.e., during a second instance of the particular time interval). In this figure, each data structure 410 and 420 contains statistical data that is reported for the same particular customer or customer configuration. The customer or customer configuration is identified in the data structures 410 and 420 with a customer identifier. In some embodiments, the customer identifier is assigned by the distributed platform when the customer registers for services of the distributed platform. The customer identifier is passed to the edge server as part of the customer's configuration that is deployed to that edge server. In some embodiments, the each data structure 410 and 420 is encoded as a dictionary to store the statistical data. In some embodiments, the dictionary includes a list of <identifier:value> pairs. The identifier of a <identifier:value> pair identifies a performance statistic and the value of the <identifier:value> pair identifies the value for that performance statistic during the current time interval. It should be apparent that the <identifier:value> pairs are shown and described herein for exemplary purposes and to facilitate the understanding of the dynamic data structures. The reporting system may utilize other formatting or structures to identify a performance statistic and its associated value in addition to or instead of the <identifier:value> pairs.

The data structures 410 and 420 are dynamic because the populated <identifier:value> pairs change depending on what statistical data the particular edge server has produced for the customer during the corresponding reporting interval. A particular <identifier:value> pair entry for a particular statistic may be populated in the data structure when the data structure is first passed to the statistics server (at a first reporting interval) and omitted when the data structure is next passed to the statistics server (at a second reporting interval). For example, the data structure 410 includes <identifier:value> pairs 430, 440, and 450, while data structure 420 omits these <identifier:value> pairs. 430 identifies the number of 4xx errors detected during a first reporting interval. 440 identifies the bandwidth consumed in passing the stream "streaml.flv" during the first reporting interval. 450 identifies the number of connections established for the stream "streaml.flv" during the first reporting interval. The data structure 420 may omit the <identifier:value> pairs 430, 440, and 450 when there was one or more 4xx errors detected during the first reporting interval and none detected during the second reporting interval. Also, the particular edge server may have ceased streaming the "streaml.flv" file during the second interval such that there was no statistical data produced for this stream during the second reporting interval.

This dynamic reporting minimizes the size of the aggregated data structures and reduces the amount of statistical data that is passed from the edge servers to the statistics server. To further reduce the size of the data structures, some embodiments compress the data structures at the edge servers before passing the compressed data structures to the statistics server.

In some embodiments, the statistics server processes the statistical data to generate and update one or more real-time granular performance reports for each customer of the distributed platform. Specifically, the processing compiles the statistical data from a set of edge servers that are involved in delivering content on behalf of a particular customer or customer configuration. The processing further derives one or more values from the compiled set of statistical data to identify the performance realized by the set of edge servers for different performance statistics.

In some embodiments, the processing occurs in real-time as the data structures are aggregated from the edge servers in the staggered manner described with reference to FIG. 3 above. Specifically, when the statistics server aggregates a data structure containing one or more statistical data <identifier:value> pairs, the statistics server identifies the customer to which the data structure pertains and the edge server that provided the data structure. The customer is identified based on the customer identifier that is included in the data structure. The edge server that provides the data structure is identified based on the connection through which the data structure is passed. In some embodiments, the connection is associated with an IP address and the IP address identifies a particular edge server from the set of edge servers of the distributed platform. Once the customer and edge server are identified, the statistics server parses the values from the data structure and updates a performance statistics table with the parsed values.

In some embodiments, the performance statistics table is an internal data structure that the statistics server maintains for each customer of the distributed platform. The performance statistics table stores current values for a set of granular performance statistics that the statistics server updates in real-time and that were included in the data structures that were most recently aggregated from the set of edge servers. In some embodiments, the performance statistics table is implemented as a hash table, object class, or as records in a database. It should be apparent that alternative implementations may also be used for the performance statistics table without loss of functionality.

Based on the current values for the statistical data stored to the performance statistics table, the statistics server derives in real-time values for the performance reports. These derived values sum or otherwise represent the totality of the set of statistical data for a set of performance metrics compiled for a particular customer. Moreover, these derived value detail the performance realized for the customer across the distributed platform irrespective of whether the customer's configuration(s) is deployed to one or more edge servers that are operated by one or more CDNs. As new data structures containing updated statistical data are continually aggregated via the staggered aggregation described above, the statistics server continually updates the stored entries in the performance statistics and with each update, the statistics server derives updated values for the performance reports.

FIG. 5 conceptually illustrates a set of performance statistics tables in accordance with some embodiments. The figure illustrates three separate performance statistics tables 510, 520, and 530. It should be apparent that the performance statistics tables may internally be stored as a single data structure even though they are conceptually represented as separate tables in FIG. 5.

Each performance statistic table 510, 520, and 530 stores statistical data for different customers of a distributed platform, wherein the statistical data has been aggregated from different edge servers of the distributed platform. Each row represents a different performance statistic. Each column represents the real-time statistical data that has been aggregated from a particular edge server that is involved in delivering content or executing some service on behalf of a customer to which the performance statistics table relates. The last column of each table 510, 520, and 530 contains the derived values for the performance reports. Specifically, each row entry in the last column is derived from the sum or total of the statistical data that is in the same row.

Whenever the statistics server aggregates a new data structure from an edge server, the statistics server identifies the customer or customer configuration to which the statistical data of the data structure relates, the statistics server accesses the performance statistics table for that customer, the statistics server identifies the column in which the statistical data for that particular edge server is stored, the statistics server updates the values in the identified column with the statistical data of the aggregated data structure, and the statistics server further updates any derived values that are in the same row as any statistical data entry that has been updated as a result of the statistical data of the aggregated data structure. For example in FIG. 5, when a data structure for customer 4321 is aggregated from edge server ES3, the statistics server updates column 540 of performance statistics table 530 using the statistical data in the data structure.

Deriving the values for the performance reports in the optimized manner above affords several efficiency advantages to other techniques employed in the prior art. Firstly, the statistics server incrementally and in real-time updates the derived values for the performance reports such that the derived values are never stale. As a result, the derived values for the performance reports are truly derived in real-time by virtue of them being updated with every new aggregated piece of statistical data. Other techniques wait the full recurring interval time until all edge servers have reported the statistical data before updating the derived values for the performance reports. The statistics server for the embodiments described herein therefore derives the values for the performance reports in O(1) time, whereas other techniques require O(N) time with N representing the time interval in which all edge servers are required to report. Secondly, by incrementally updating the derived values for the performance reports as a result of the staggered statistical data aggregation, the load on the statistics server to derive the real-time values for the performance reports is reduced. Specifically, for the derivation of any value of the performance reports, the statistics server is at most required to store two values: (1) the current value for a particular statistic as stored in a performance statistic table and (2) the current derived value for the performance statistic. As a new value for the current value is obtained from an aggregated data structure, the statistics server computes the delta value or difference between the new value and the current value, then the statistics server updates the derived value by summing the delta value to the derived value. In this manner, the derived values for the performance reports can be incrementally updated with simple arithmetic operations and the computational and memory loads for performing the incremental updates is proportionally distributed over the recurring time interval as the statistical data updates arrive in the staggered manner described above.

The optimizations further allow the statistics server to support more granular reporting. This includes the ability to provide real-time reporting for greater numbers of performance statistics, some of which are listed in Table 1 above. This also includes the ability to identify different granular views for the realized performance across the distributed platform. For example, the statistical data in a performance statistics table can be used to identify the realized performance for a customer in a particular geographic region as opposed to the entire distributed platform. To do so, the statistics server isolates the columns in the appropriate performance statistic table that store the statistical data for the edge servers that are located in the particular geographic region. The statistical data in those columns can then be used to present the performance realized in the particular geographic region and thereby provide a different granular view.

It should be noted that the performance statistics tables of some embodiments do not maintain a historic log of past reported values or past derived values for the performance reports. Instead, the historic logging of values is offloaded to the user client as is described in the subsection below referencing the portal of the reporting system. In so doing, the amount of memory and/or storage that is consumed in updating the performance statistics tables and in deriving the values for the performance reports is greatly reduced. In fact, in many instances, the performance statistics tables can be wholly retained in main memory of the statistics server as opposed to secondary storage of the statistics server. As a result, the statistics server does not waste computational cycles while waiting to transition data from slower secondary storage to faster main memory. In some embodiments, the performance statistics tables are modified to store a small set of past values such that a brief historic log can be provided to a customer upon request without compromising the above described efficiency gains.

In some embodiments, the statistics server performs a cleansing routine to ensure that the derived values for the performance statistics are accurate even when one or more of the edge servers: (1) cease to report a particular performance statistic in the dynamic data structure, (2) begin reporting a new performance statistic in the dynamic data structure, or (3) fail to provide the data structure to the statistics server during a particular interval as a result of a network failure or edge server failure.

The pseudo code below summarizes the cleansing routine for a derived value for a particular performance statistic in accordance with some embodiments:

| If New Value (N) for an existing Current Value (C) is received | (1) |
| Then Derived Value (DV) = DV + (N − C) | (2) |
| If N for a non-existing C is received | (3) |
| Then DV = DV + N | (4) |
| If no N is received for an existing C | (5) |
| Then DV = DV + (0 − C) | (6) |

A New Value (N) represents a value for a particular statistic that is stored in an <identifier:value> pair of a data structure aggregated from an edge server. The Current Value (C) represents a stored value in a performance statistics table for the particular statistic identified by the New Value. The Derived Value (DV) represents the value that was derived based on the compiled set of statistical data reported by the edge servers for the particular statistic.

Steps 1-4 of the cleansing routine are performed for each <identifier:value> pair in an aggregated data structure. Steps 5 and 6 of the cleansing routine are performed for the stored values in the performance statistics table where a value for the corresponding statistic was omitted from the aggregated data structure. In other words, steps 5 and 6 are performed when the data structure does not contain an <identifier:value> that updates a stored value in the performance statistics table.

Figure 6:
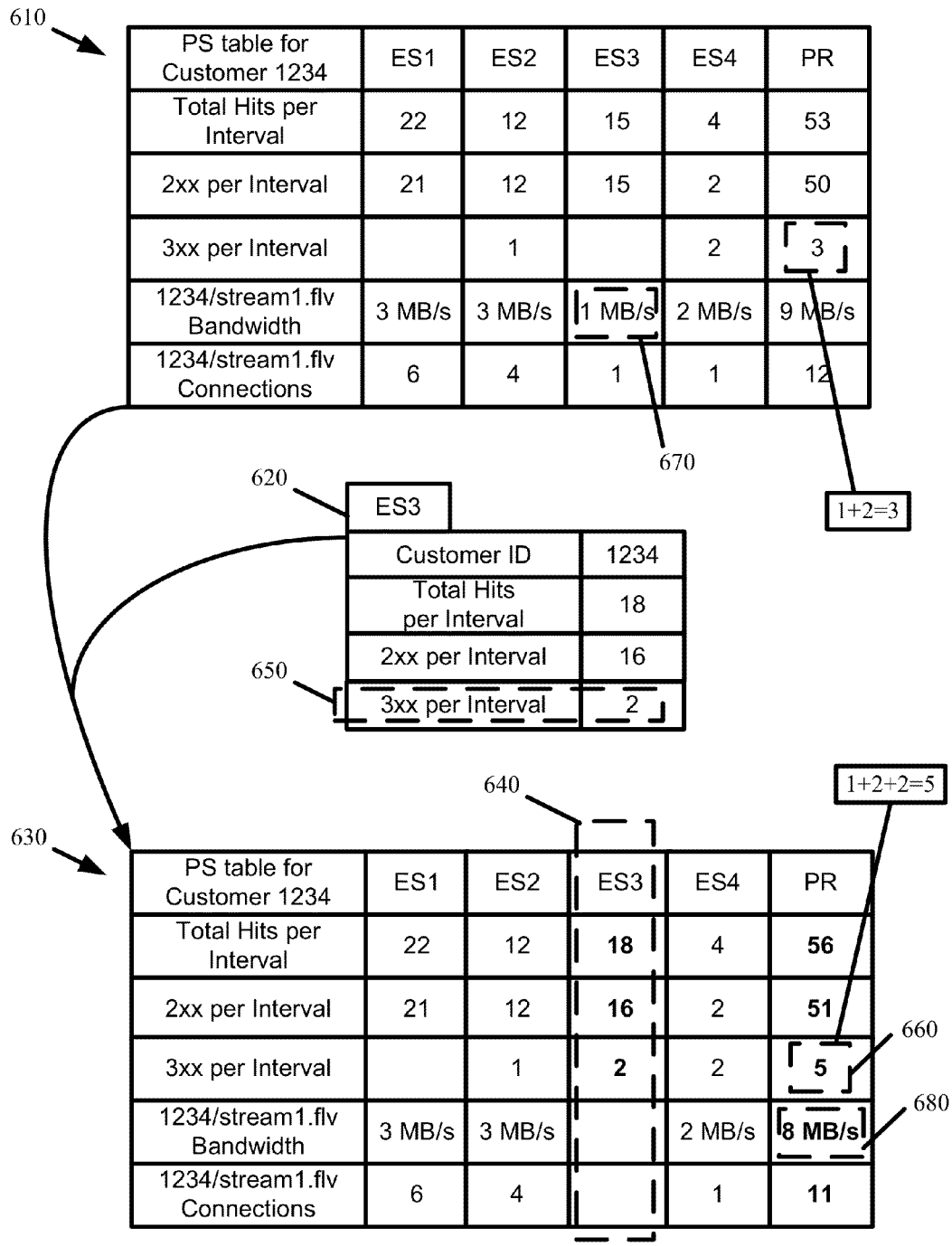
FIG. 6 conceptually illustrates the cleansing routine in accordance with some embodiments.

FIG. 6 conceptually illustrates the cleansing routine in accordance with some embodiments. At 610, the figure illustrates a performance statistics table prior to it being updated with statistical data of data structure 620. At 630, the figure illustrates the performance statistics table after it has been updated with the statistical data of data structure 620. The bolded entries at 630 illustrate which entries were updated.

The data structure 620 is aggregated from edge server "ES3". Therefore, the <identifier:value> pairs in the data structure 620 are used to update column 640 of the performance statistics table. For performance statistic 650, updated statistical data is included in the data structure 620, but a current value does not exist in the performance statistics table at 610. Therefore, the statistical data is used as a new value which gets stored to the appropriate row in column 640 and the derived value 660 is modified to incorporate the new value. For performance statistic 670, a new value is not present in the data structure 620, but a current value was stored in the performance statistics table at 610 and used in the derivation of the derived value 680. Accordingly, the current value is removed from the performance statistics table at 630 and the derived value 680 is updated to reflect the omission of the reporting of that value from edge server ES3.

To further optimize the processing of the aggregated statistical data, some embodiments alter the statistical data that is reported in the dynamic data structures. In some such embodiments, the aggregated statistical data includes delta values for each of a set of performance statistics instead of the actual values. Aggregating delta values further reduces the memory and processing overhead at the statistics server. Specifically, the delta values for a particular statistic represent changes in that statistic without the statistics server having to compute the change and without the statistics server having to store a current actual value and a new actual value in order to compute the change. Instead, the computation of the change (i.e., the delta value) is offloaded to the distributed set of edge servers that then incorporate the delta value into the data structure that is passed to the statistics server. Each edge server is therefore modified to retain a current actual value while a new actual value for each reported statistic is produced. The edge server computes the difference between the new value and the current value and the resulting delta value is populated in the data structure that is passed to the statistics server. Upon receiving the delta value, the statistics server merely needs to add the delta value to the derived value for the performance report of the corresponding performance statistic in order to perform a real-time update of that value.

B. Portal

With reference back to FIG. 2, the portal 220 of the reporting system is the interface through which customers or system administrators of the distributed platform can log in to view the performance reports. The portal 220 is accessible with a standard web browser client that is pointed to the portal site (e.g., www.distributedplatform.com/performance). Standard web browser clients include Microsoft's Internet Explorer, Mozilla's Firefox, and Google's Chrome. It should be apparent that in some embodiments, the portal 220 may be accessed using other tools such as a standalone application.

Figure 7:
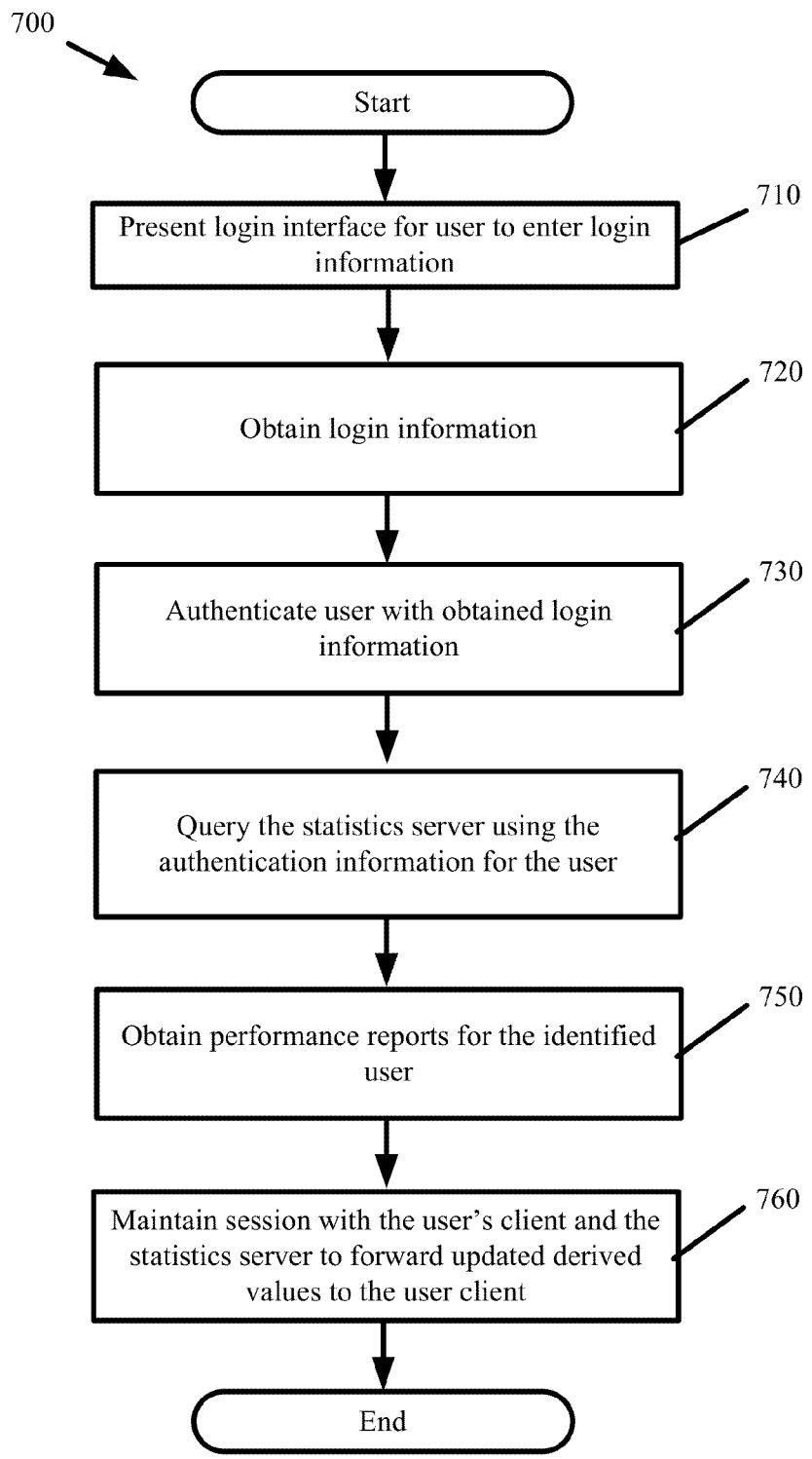
FIG. 7 presents an authentication process performed by the portal in accordance with some embodiments.

In some embodiments, the portal 220 performs an authentication process when it is first accessed by a customer of the distributed platform. In other words, the authentication process is performed when a customer connects to the portal 220 and an existing session does not exist for that customer. The authentication process is performed to identify the customer and identify which performance reports the customer is allowed to view. FIG. 7 presents an authentication process 700 performed by the portal in accordance with some embodiments.

The process 700 begins when the portal is accessed by a customer and the customer does not have an existing session with the portal. The process presents (at 710) a login interface for the customer to enter login information such as a username and password. The process obtains (at 720) the login information and authenticates (at 730) the customer against the reporting system database (see database 230 of FIG. 2). In some embodiments, the database maintains various records for mapping the obtained login information to an identifier that is used in the distributed platform to identify customers.

When the login information is valid and the authentication information is obtained, the process proceeds to present the performance reports for the customer. To do so, the process queries (at 740) the statistics server using the authentication information for the customer and in response, the process obtains (at 750) the performance reports for the identified customer. In some embodiments, the query involves passing the customer identifier to the statistics server and the statistics server returns the derived values for the performance report by identifying the appropriate performance statistic table for the customer based on the customer identifier.

The process maintains (at 760) a session with the customer's client and the statistics server such that whenever a derived value in the performance report is updated at the statistics server, the process forwards the updated derived values to the customer client. In this manner, the updated performance reports are presented to the customer. The process 700 ends when the customer closes the client or logs out from the portal.

By maintaining the session with the customer's client and providing the real-time updates to the performance reports, the portal causes the customer client to compile historic trend data. The longer the customer client maintains the session, the greater the history for a particular performance report. By compiling the historic trend data on the customer's client, the statistics server is offloaded from having to store more than the current derived values for each performance statistic of the performance reports. This greatly reduces the memory and storage overhead for the statistics server such that it can support real-time granular statistics reporting for larger number of customers.

In some embodiments, the portal provides one or more interactive tools to alter the presentation of the performance reports. One such tool allows the customer to increase or decrease the rate with which the performance reports are updated on the customer client. As noted above with reference to FIG. 3, the staggered aggregation and incremental updating of the performance reports enable the reporting system the ability to update and present the performance reports with a higher frequency than the recurring intervals in which statistical data from all edge servers is aggregated. Consequently, the granularity for the real-time refresh rate is customer specifiable and adjustable to a high frequency refresh rate that is otherwise unsupported by other reporting systems. Another interactive tool allows the customer to adjust the granularity of the derived values presented in the performance reports. For example, the customer can use the tool to view a performance report for all deployed configurations of the customer or a performance report for a single deployed configuration of the customer. As another example, the customer can use the tool to view the performance realized for its configuration across the entire distributed platform or, more granularly, to view the performance realized at a particular geographic region or POP.

C. Database

The database is the storage repository for the reporting system. As noted above, the reporting system database is used for authentication purposes to store customer login information and the mapping between the login information and the customer identifiers used in the distributed platform. In some embodiments, the database also stores mapping information. When the reporting system is integrated with the Open CDN platform, mapping may be required to convert between internal customer identifiers of the CDNs and global customer identifiers used in the Open CDN platform. This is so statistical data can be compiled and reported even when a customer's configuration is deployed across two different CDNs that internally assign different customer identifiers to that customer. Accordingly, the reporting system can store the mappings between the internal CDN customer identifiers and the global Open CDN platform customer identifiers. Additionally mappings may be stored in the reporting system database to facilitate the data cleansing and normalization of statistical data that is formatted differently by different CDNs. In some embodiments, the reporting system database stores the mapping for identifying which edge servers a customer's configuration is deployed to and therefore which edge servers contain the statistical data that is needed to produce the performance reports for a given customer.

II. Reporting System Framework

FIG. 2 above illustrates a framework in which the reporting system can be integrated in a distributed platform. FIGS. 8-14 illustrate other frameworks in which the reporting system of some embodiments can be integrated with other distributed platforms.

Figure 8:
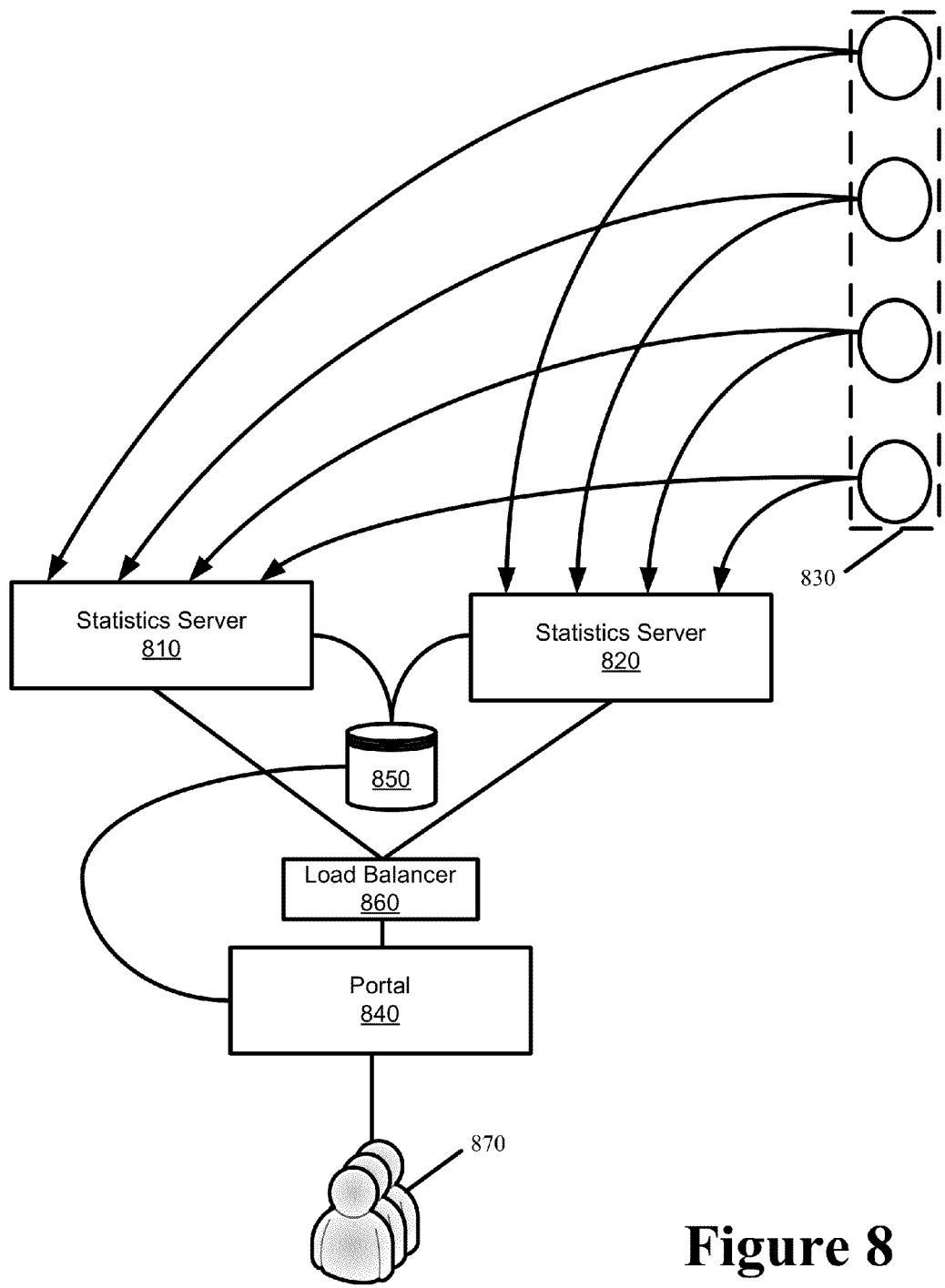
FIGS. 8-10 illustrate frameworks for scaling the statistics servers of the reporting system in accordance with some embodiments.

FIG. 8 illustrates a framework for scaling the statistics servers of the reporting system in accordance with some embodiments. This figure includes two statistics servers 810 and 820 that aggregate the same statistical data from the set of edge servers 830. The figure further includes the portal 840, database 850, load balancer 860, and users 870.

In this framework, when user requests come in to the portal 840, the portal 840 forwards the requests to the load balancer 860. The load balancer 860 distributes the requests across the two statistics servers 810 and 820 such that the load on each statistics server 810 and 820 is balanced. Moreover, the load balancer 860 can compensate for a statistics server failure such that if one of the statistics server 810 or 820 becomes unreachable, all requests can be forwarded to the other statistics server that is operational. Accordingly, the framework of FIG. 8 may be provided for purposes of redundancy and scalability. In some embodiments, the load balancing function performed by the load balancer 860 can be integrated into the portal 840.

Figure 9:
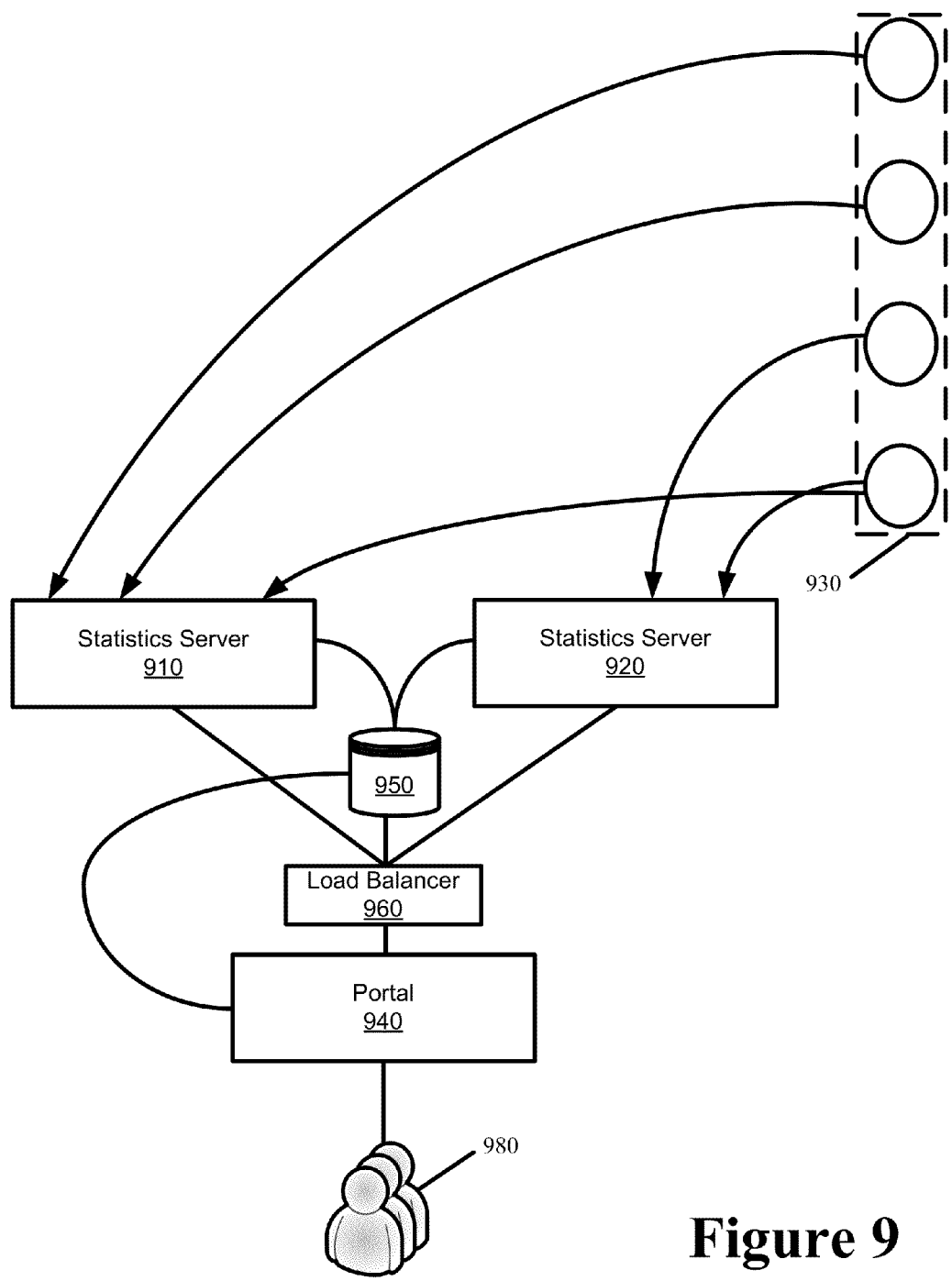

FIG. 9 illustrates an alternative framework for scaling the statistics servers of the reporting system in accordance with some embodiments. The components of FIG. 9 mirror those of FIG. 8 and include two statistics servers 910 and 920, a set of edge servers 930, portal 940, database 950, load balancer 960, and users 970. However in this figure, the statistics server 910 aggregates different statistical data than the statistics server 920. A distribution algorithm may be used to aggregate statistical data for a first set of customers to the first statistics server 910 and to aggregate statistical data for a different second set of customers to the second statistics server 920. In some embodiments, the distribution algorithm is configured on the statistics servers 910 and 920 when the statistics servers 910 and 920 pull the statistical data from the set of edge servers 930. In some embodiments, the distribution algorithm is configured on the set of edge servers 930 when the set of edge servers 930 push the statistical data to the statistics servers 910 and 920. In still some other embodiments, the distribution algorithm is stored to the database 950 where it is accessible by the other components 910-940 and 960 of the reporting system. The distribution algorithm can be defined such that all customers having a customer identifier falling in a first range of values have their statistical data aggregated to the first statistics server 910 and all customers having a customer identifier falling in a second range of values have their statistical data aggregated to the second statistics server 920. The distribution algorithm can also be defined using a variety of hashing techniques including Caching Array Routing Protocol (CARP) hashing. It should be noted that a particular edge server may provide statistical data for a first customer configuration to the statistics server 910 while providing statistical data for a second customer configuration to the statistics server 920.

The distribution algorithm is also configured on the load balancer 960 so that incoming users requests to view performance reports are forwarded from the portal 940 to the proper statistics server 910 or 920 that aggregates the statistical data needed to derive the performance reports for the requesting user. In some embodiments, the load balancer 960 identifies which statistics server 910 or 920 stores the performance reports for a particular user by querying the database 950 with the customer identifier for that user. Alternatively, the portal 940 may identify which statistics server stores the performance reports for a particular user when the portal authenticates the particular user with the database 950 such that the load balancer 960 can be omitted from the platform without loss of functionality.

Figure 10:
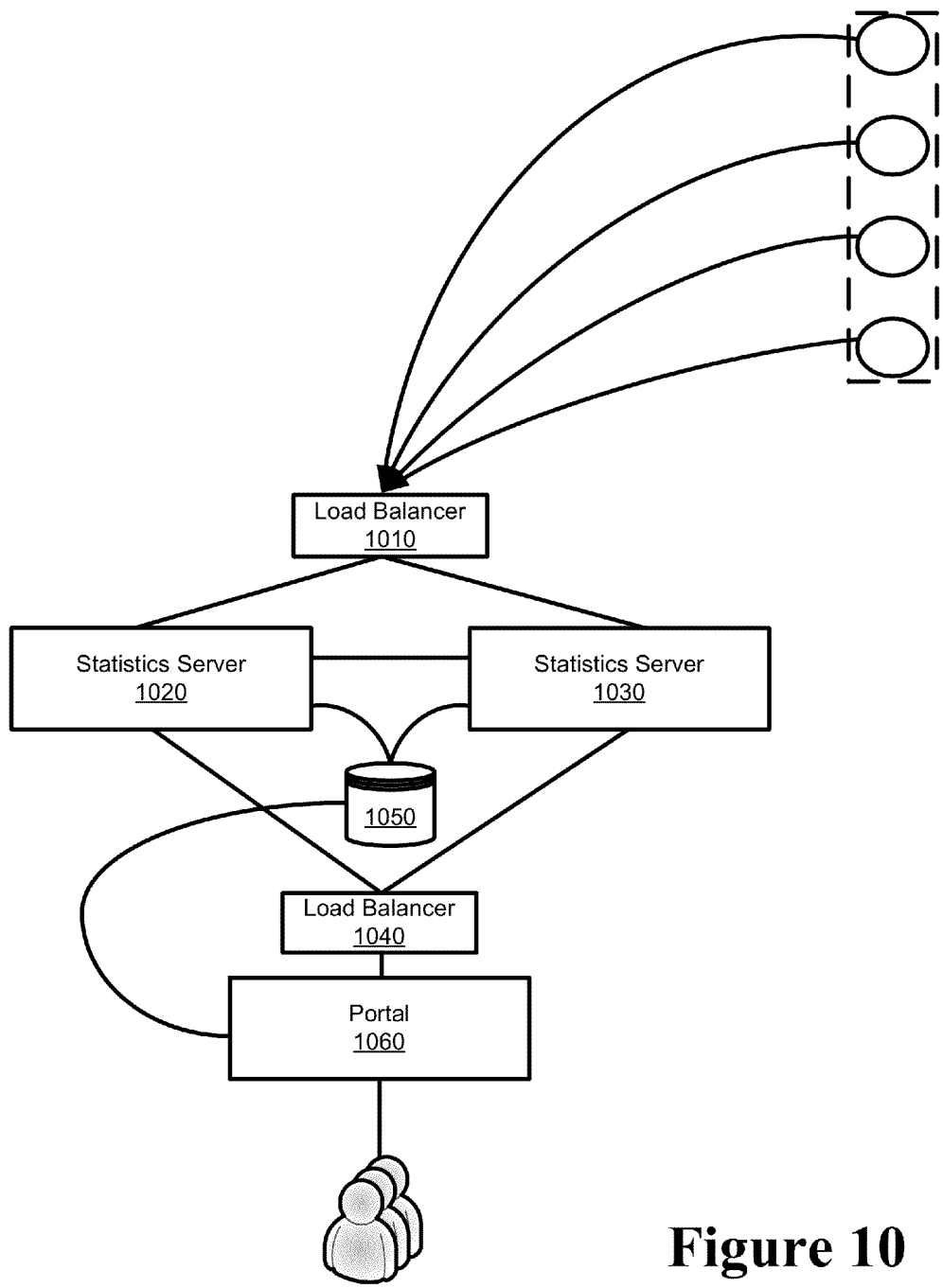

FIG. 10 illustrates a hybrid framework for scaling and providing redundancy in the reporting system in accordance with some embodiments. In this figure, the reporting system includes a back-end load balancer 1010, two interoperating statistics servers 1020 and 1030, a front-end load balancer 1040, database 1050, and portal 1060. The back-end load balancer 1010 proportionally distributes the aggregated statistical data across the statistics servers 1020 and 1030. The distribution can be controlled with a simple round-robin scheme or intelligent hashing scheme. The statistics servers 1020 and 1030 then broadcast the aggregated statistical data to one another such that the aggregated statistical data is replicated locally. By replicating locally, the edge servers can avoid having to redundantly pass the same statistical data over more expensive, slower, and more error-prone data network connections that communicably couple the edge servers to the statistics servers 1020 and 1030. The local replication affords redundancy in the event one of the statistics server 1020 or 1030 becomes unreachable. The front-end local balancer 1040 balances the customer load across the statistics server 1020 and 1030 and provides failover in the event one of the statistics servers 1020 and 1030 fails.

The scalability and efficiency of the reporting system of some embodiments lends itself ideal for integration in an Open CDN platform. As described in United States provisional patent application entitled "Open Content Delivery Network Platform with Capacity Exchange" with Ser. No. 61/524,294, the Open CDN platform facilitates the sharing of capacity between different CDN service providers (CDNSPs) to allow any CDNSP to (1) dynamically scale its capacity without incurring additional infrastructure costs, (2) expand the reach of its CDN into previously untapped geographic regions without physically establishing points of presence (POPs) at those geographic regions, and (3) reduce sunk costs associated with unused capacity of already deployed infrastructure by selling that unused capacity to other CDNSPs that are in need of additional capacity.

To do so, the Open CDN platform provides a capacity exchange to which CDNSPs can publish and sell excess capacity and CDNSPs in need of additional capacity can acquire desired capacity that meets their qualifications. In this manner, the Open CDN platform facilitates a collaboration and synergy of existing CDNSPs infrastructure and capacity, thereby enabling each CDNSP participating in the Open CDN platform to achieve a truly global presence irrespective of the infrastructure limitations of any individual CDNSP.

However, reporting in an Open CDN platform is particularly complicated because of the amount of statistical data that is to be aggregated and processed. The Open CDN platform combines the infrastructures of multiple CDNs. As a result, the reporting system for the Open CDN platform needs to be highly scalable in order to support data aggregation from edge servers of more than one CDN and in order to support real-time granular reporting for customers of more than one CDN. The efficiency and scalability optimizations for statistical data aggregation and performance reporting described above lend the reporting system of some of the embodiments described herein especially well suited for integration with the Open CDN platform.

Figure 11:
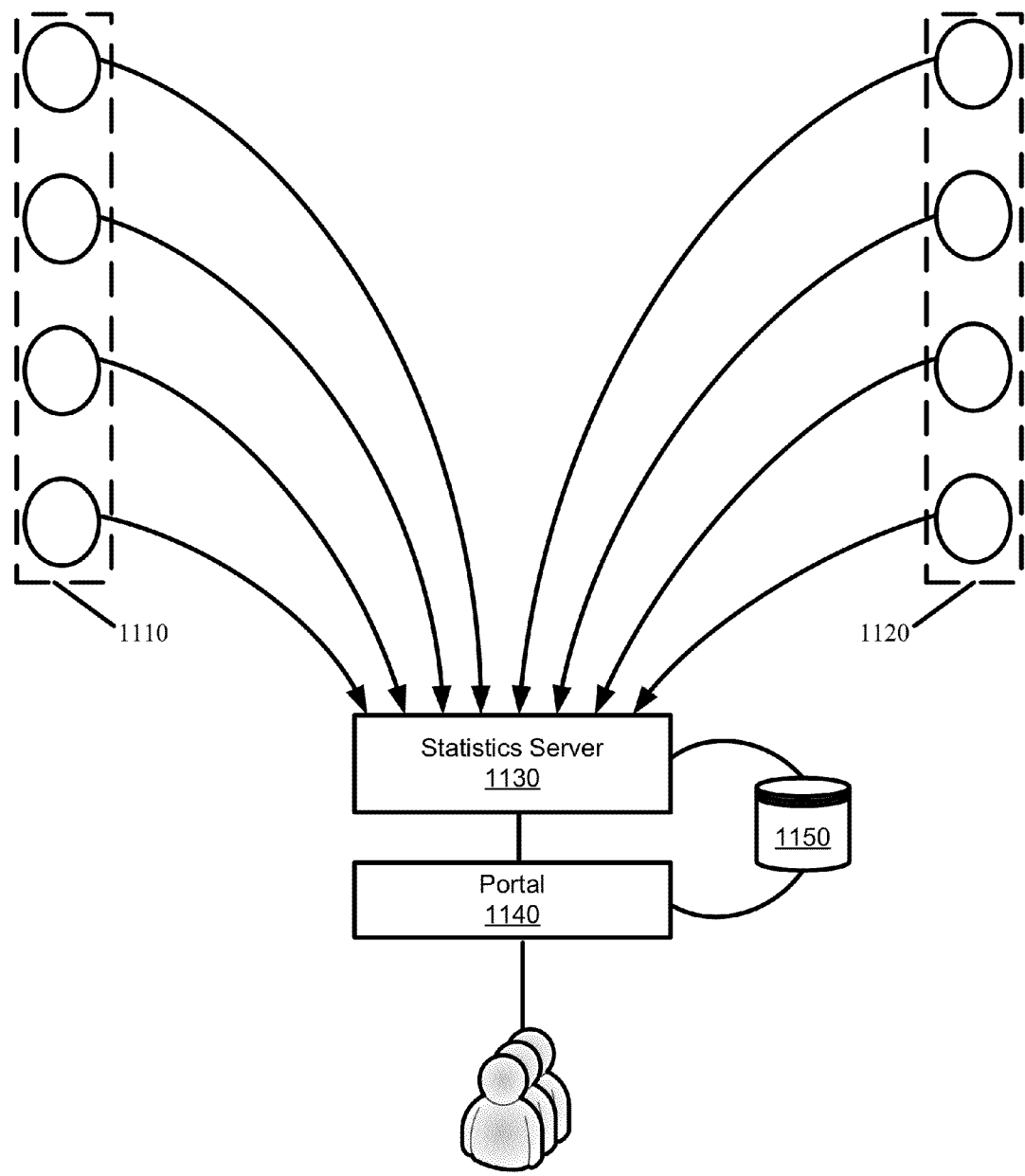
FIGS. 11-14 illustrate frameworks for integrating the reporting system of some embodiments into an Open CDN platform.

In some embodiments, the reporting system integrates at different levels of the Open CDN platform depending on the Open CDN platform implementation. FIG. 11 illustrates a first framework for integrating the reporting system of some embodiments into an Open CDN platform. This figure illustrates a first set of edge servers 1110 that are operated by a first CDNSP, a second set of edge servers 1120 that are operated by a second CDNSP, statistics server 1130, portal 1140, and database 1150.

In this figure, the reporting system provides performance statistic reporting for both CDNSPs through the portal 1140. To do so, the statistics server 1130 aggregates statistical data from the first set of edge servers 1110 and the second set of edge server 1120. In a first implementation, the statistics server 1130 may be configured with the addressing information of each edge server in the first 1110 and second 1120 sets of edge servers so that the statistical data is pulled from the edge servers at different staggered windows within a recurring time interval. In a second implementation, each edge server in the first 1110 and second 1120 sets of edge servers is configured to forward its statistical data to the statistics server 1130 at a specified window within the recurring time interval.

By aggregating the statistical data from the edge servers of the two CDNs centrally at the statistics server 1130, the reporting system can produce performance reports for a customer configuration that is deployed to at least one edge server in the first set of edge servers 1110 and at least one edge server in the second set of edge servers 1120.

In some embodiments, the statistics server 1130 performs a mapping to produce normalized statistical data when aggregating statistical data from the edge servers of the different CDNs. This mapping is performed when the statistical data aggregated from each CDN is formatted differently or contains different fields. Therefore, to ensure commonality in performance reports derived for the Open CDN platform, the statistics server 1130 prunes, cleans, and standardizes the statistical data from the different CDNs. In some embodiments, data pruning and data cleaning involves removing extraneous or proprietary statistical data in order to derive a common set of statistical data for all CDNs participating in the Open CDN platform. In some embodiments, data standardization involves converting the collected statistical data to the same timeframe, scale, and units as some examples.

Figure 12:
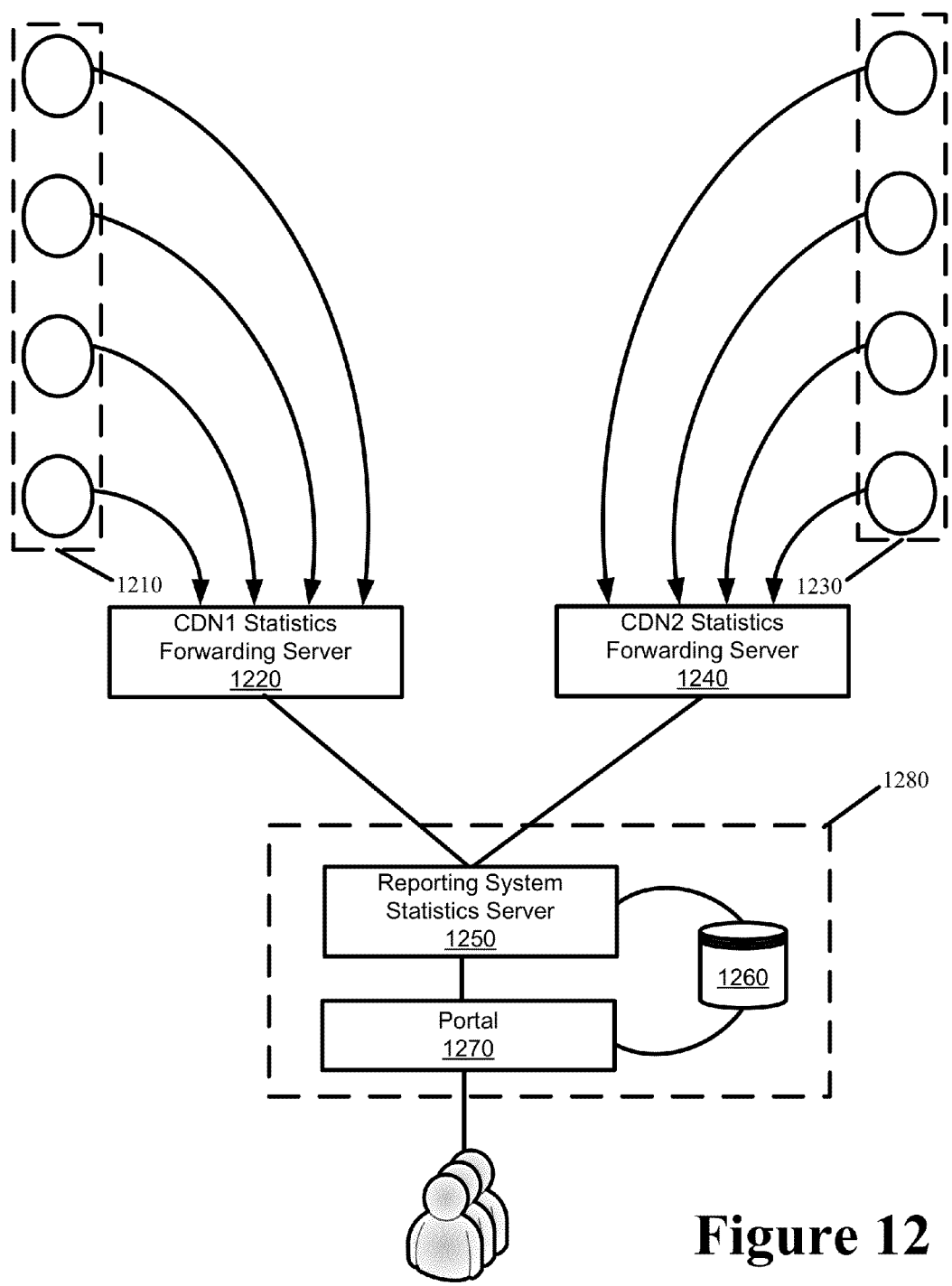

FIG. 12 illustrates an alternative framework for integrating the reporting system of some embodiments into an Open CDN platform. In this figure, a first set of edge servers 1210 operated by a first CDNSP provides its statistical data to a statistics forwarding server 1220 of the first CDNSP and a second set of edge servers 1230 operated by a second CDNSP provides its statistical data to a statistics forwarding server 1240 of the second CDNSP. Accordingly, each CDNSP aggregates statistical data as it would if operating independent of the Open CDN platform. This figure further includes the statistics server 1250, database 1260, and portal 1270 of the reporting system 1280 of some embodiments.

The integration of the reporting system 1280 with the Open CDN platform allows for a customer configuration to be deployed inter-CDN (i.e., to an edge server of the first CDNSP and an edge server of the second CDNSP). Without the reporting system 1280, each statistics forwarding server 1220 and 1240 will have incomplete statistical data to report on an inter-CDNSP deployed customer configuration. This is because each statistics forwarding server 1220 and 1240 aggregates statistical data from only the set of edge servers that are operated by its CDNSP. As a result, statistics forwarding server 1220 of the first CDNSP will not have access to the statistical data produced by any of the edge servers in the second set of edge servers 1230 operated by the second CDNSP and the statistics forwarding server 1240 of the second CDNSP will not have access to the statistical data produced by any of the edge servers in the first set of edge servers 1210 operated by the first CDNSP.

To facilitate inter-CDN reporting, the reporting system statistics server 1250 is configured to aggregate statistical data from each of the statistics forwarding servers 1220 and 1240. In some embodiments, the statistics forwarding servers 1220 and 1240 automatically forwards statistical data that they have aggregated to the reporting system statistics server 1250. However, the statistics forwarding servers 1220 and 1240 need not be implemented with such functionality.

The statistics server 1250 processes the aggregated statistical data to produce the performance reports for the customer configurations of each of the first and second CDNSPs. In some embodiments, processing the aggregated data involves mapping and normalization. In some embodiments, mapping includes translating between internal customer identifiers of each of the CDNSPs to an Open CDN customer identifier. This translation allows the statistics server 1250 to match statistical data for a particular customer when each CDNSP produces statistical data for that particular customer using their internal customer identifiers that are inconsistent with one another. In some embodiments, the database 1260 stores the mapping between the internal CDNSP identifiers and the Open CDN identifiers. In some embodiments, each CDNSP is enhanced with an Open CDN application programming interface (API) that performs the customer identifier translation when the statistical data is passed from the internal statistics server (i.e., servers 1220 and 1240) to the statistics server 1250 of the reporting system 1280. As before, the portal 1270 provides the interface through which users are authenticated and presented with the performance reports.

Figure 13:
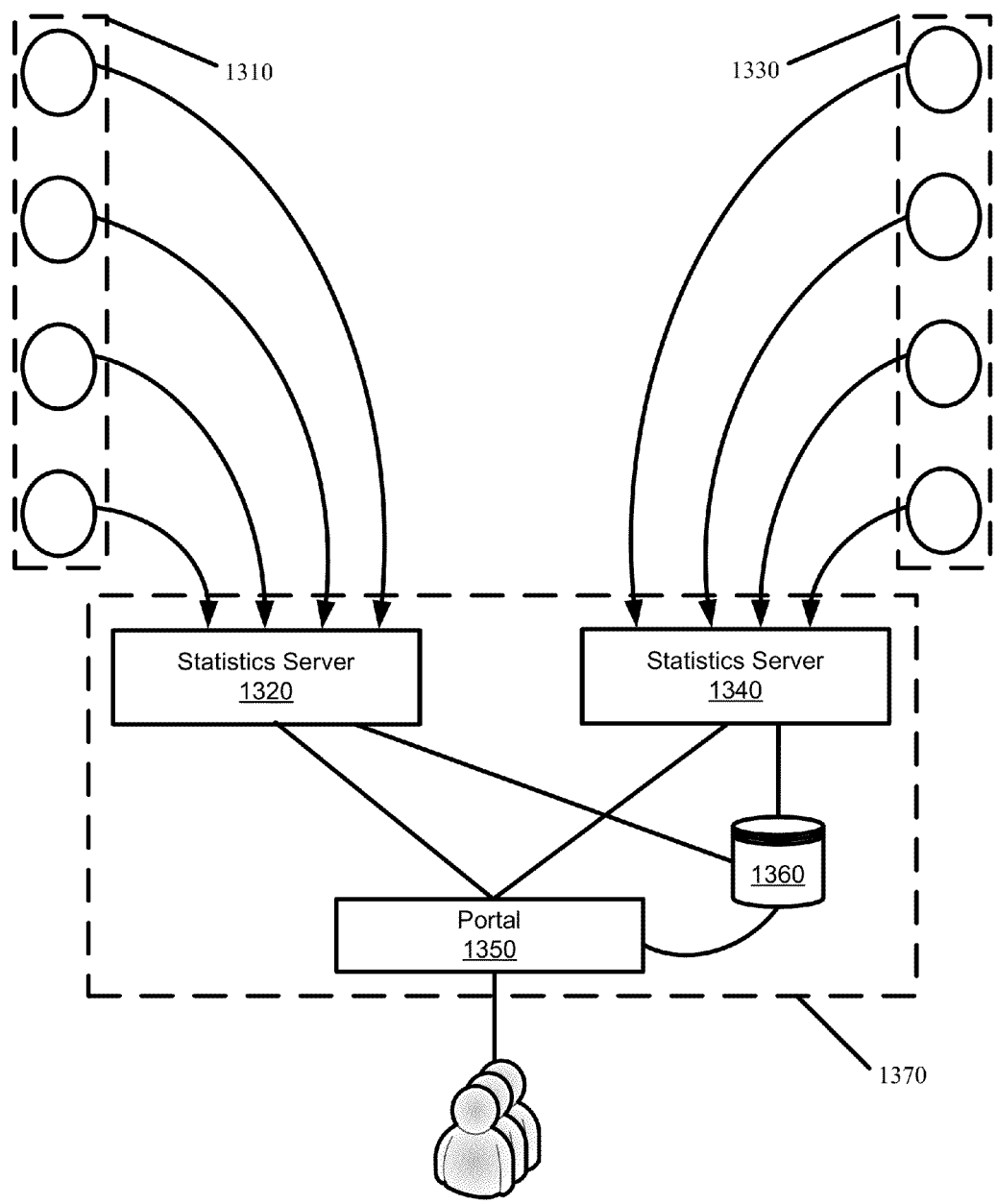

FIG. 13 illustrates an alternative framework for integrating the reporting system of some embodiments into an Open CDN platform. In this figure, a separate statistics server of the reporting system is integrated with each CDNSP. The set of edge servers 1310 operated by the first CDNSP provide statistical data to the statistics server 1320 of the reporting system 1370 and the set of edge servers 1330 operated by the second CDNSP provide statistical data to the statistics server 1340 of the reporting system 1370. When a customer request is received at the portal 1350, the portal 1350 accesses the database 1360 to determine where performance reports for that customer reside. In other words, the portal 1350 accesses the database 1360 to determine which edge servers are involved in the deployment of that customer's configuration and as a result, which of the statistics servers 1320 and 1340 have aggregated statistical data for that customer configuration. The portal 1350 then acquires the performance reports from (1) the statistics server 1320 when the customer's configuration is wholly deployed to the first CDNSP, (2) the statistics server 1340 when the customer's configuration is wholly deployed to the second CDNSP, and (3) both the statistics servers 1320 and 1340 when the customer's configuration is deployed to both the first and second CDNSPs. It should be apparent that the framework of FIG. 13 can be modified such that the statistics servers 1320 and 1340 are operated by the respective CDNSP instead of the reporting system without loss of functionality.

Figure 14:
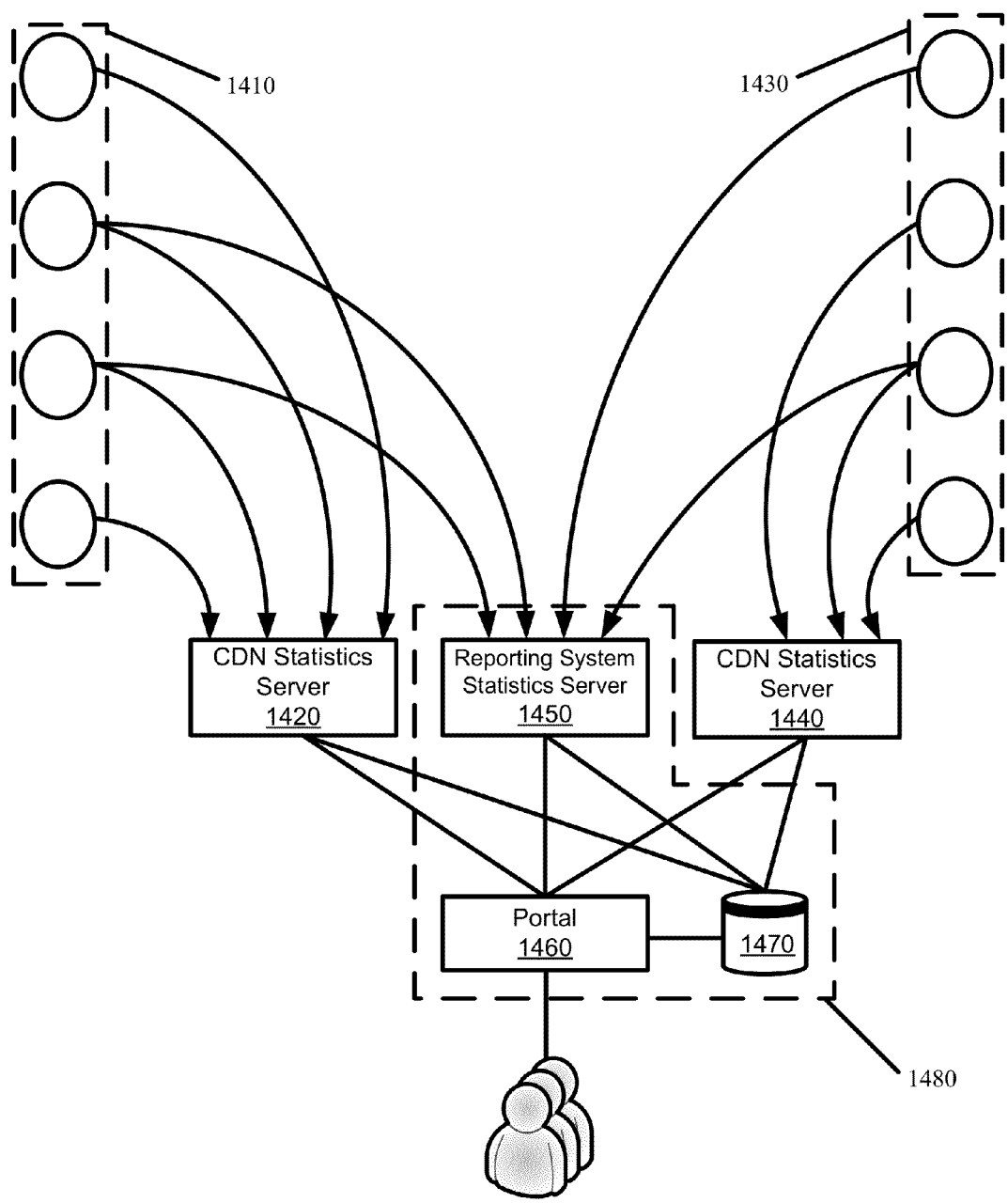

FIG. 14 illustrates yet another framework for integrating the reporting system of some embodiments into an Open CDN platform. This figure includes a first set of edge servers 1410 and a statistics server 1420 operated by a first CDNSP, a second set of edge servers 1430 and a statistics server 1440 operated by a second CDNSP, and the reporting system 1480 comprising a statistics server 1450, portal 1460, and database 1470.

In this figure, statistical data from the first set of edge servers 1410 is aggregated at the statistics server 1420 when the statistical data is produced as a result of a configuration that is associated with a customer of the first CDNSP and at the statistics server 1450 when the configuration does not belong to a customer of the first CDNSP. Similarly, statistical data from the second set of edge servers 1430 is aggregated at the statistics server 1440 when the statistical data is produced as a result of a configuration that is associated with a customer of the second CDNSP and at the statistics server 1450 when the configuration does not belong to a customer of the second CDNSP.

When a user request is received at the portal 1460, the portal 1460 authenticates the user and determines whether the user is associated with a customer configuration that has been deployed to a single CDNSP or multiple CDNSP. Such information is retained in the database 1470. Then based on the determination, the portal 1460 identifies where to retrieve the performance reports for that customer.

III. Server System

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine is meant in its broadest sense, and can include any electronic device with a processor including cellular telephones, smartphones, portable digital assistants, tablet devices, laptops, notebooks, and desktop computers. Examples of computer readable media include, but are not limited to, CD-ROMs, flash drives, RAM chips, hard drives, EPROMs, etc.

Figure 15:
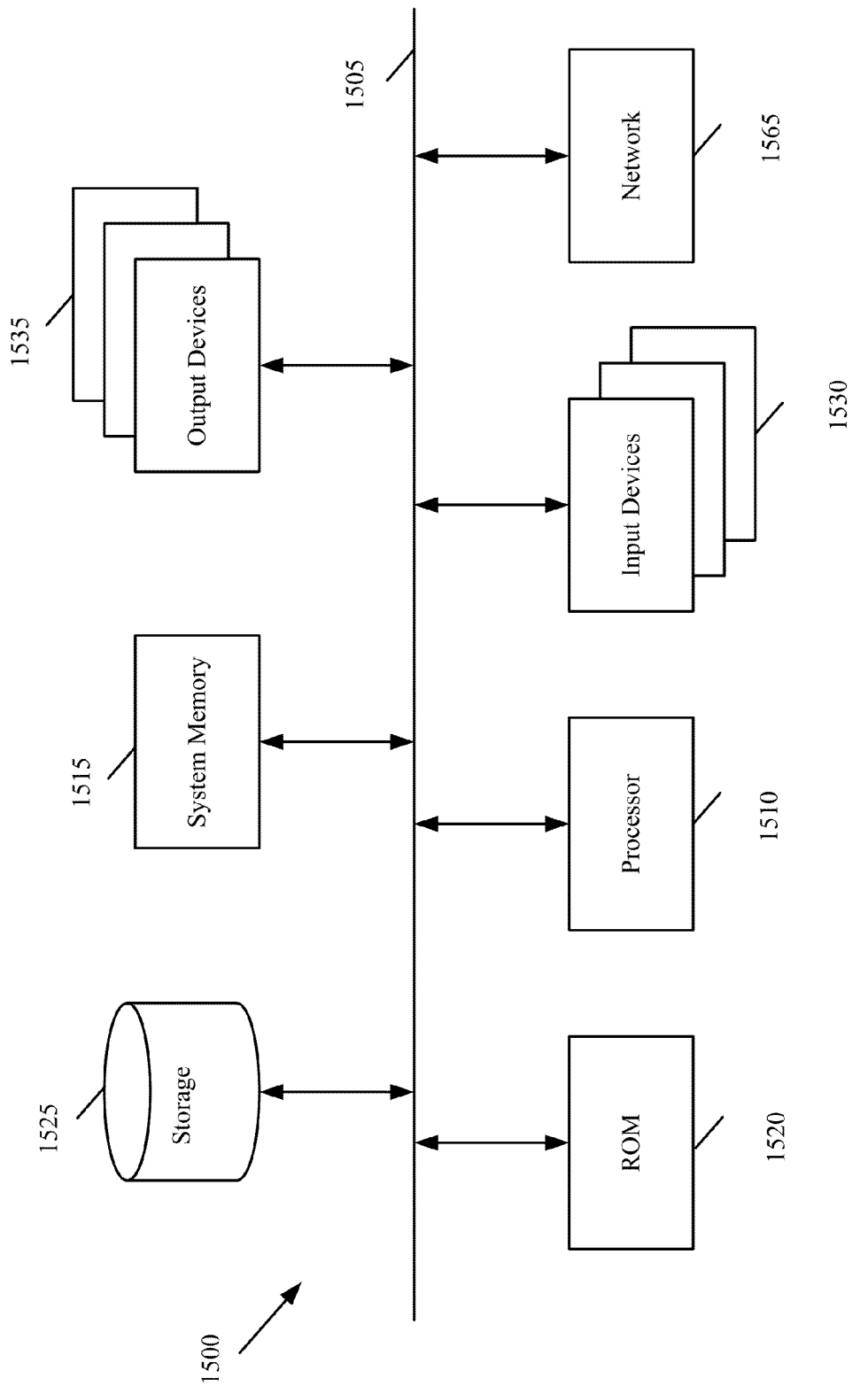
FIG. 15 illustrates a computer system or server with which some embodiments are implemented.

FIG. 15 illustrates a computer system or server with which some embodiments are implemented. Such a computer system includes various types of computer readable mediums and interfaces for various other types of computer readable mediums that implement the various processes and modules described above (e.g., statistics server, portal, and database). Computer system 1500 includes a bus 1505, a processor 1510, a system memory 1515, a read-only memory 1520, a permanent storage device 1525, input devices 1530, and output devices 1535.

The bus 1505 collectively represents all system, peripheral, and chipset buses that communicatively connect the numerous internal devices of the computer system 1500. For instance, the bus 1505 communicatively connects the processor 1510 with the read-only memory 1520, the system memory 1515, and the permanent storage device 1525. From these various memory units, the processor 1510 retrieves instructions to execute and data to process in order to execute the processes of the invention. The processor 1510 is a processing device such as a central processing unit, integrated circuit, graphical processing unit, etc.

The read-only-memory (ROM) 1520 stores static data and instructions that are needed by the processor 1510 and other modules of the computer system. The permanent storage device 1525, on the other hand, is a read-and-write memory device. This device is a non-volatile memory unit that stores instructions and data even when the computer system 1500 is off. Some embodiments of the invention use a mass-storage device (such as a magnetic or optical disk and its corresponding disk drive) as the permanent storage device 1525.

Other embodiments use a removable storage device (such as a flash drive) as the permanent storage device Like the permanent storage device 1525, the system memory 1515 is a read-and-write memory device. However, unlike storage device 1525, the system memory is a volatile read-and-write memory, such a random access memory (RAM). The system memory stores some of the instructions and data that the processor needs at runtime. In some embodiments, the processes are stored in the system memory 1515, the permanent storage device 1525, and/or the read-only memory 1520.

The bus 1505 also connects to the input and output devices 1530 and 1535. The input devices enable the user to communicate information and select commands to the computer system. The input devices 1530 include alphanumeric keypads (including physical keyboards and touchscreen keyboards), pointing devices (also called "cursor control devices"). The input devices 1530 also include audio input devices (e.g., microphones, MIDI musical instruments, etc.). The output devices 1535 display images generated by the computer system. The output devices include printers and display devices, such as cathode ray tubes (CRT) or liquid crystal displays (LCD).

Finally, as shown in FIG. 15, bus 1505 also couples computer 1500 to a network 1565 through a network adapter (not shown). In this manner, the computer can be a part of a network of computers (such as a local area network ("LAN"), a wide area network ("WAN"), or an Intranet, or a network of networks, such as the internet. For example, the computer 1500 may be communicably coupled through the network 1565 to an ingest server, mid-tier server, edge server, content provider streaming server, or end user device.

As mentioned above, the computer system 1500 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for providing real-time granular statistics reporting in a distributed platform, the method comprising:
   aggregating statistical data for a plurality of customer configurations from different sets of servers that are operated by a plurality of different content delivery networks (CDNs), wherein each customer configuration of the plurality of customer configurations is deployed to at least one server of the different sets of servers;
   from the aggregated statistical data, grouping a subset of statistical data for a particular customer configuration that is deployed to at least one server that is operated by a first CDN of the plurality of CDNs and to at least one server that is operated by a second CDN of the plurality of CDNs; and
   deriving a set of values from the grouped subset of statistical data to identify performance realized for the particular customer configuration across said first CDN and said second CDN.

2. The method of claim 1 further comprising incrementally updating the derived set of values in real-time as statistical data for the particular customer configuration is aggregated from any server to which the particular customer configuration is deployed.

3. The method of claim 1 further comprising presenting the derived set of values in real-time to a customer associated with the particular customer configuration.

4. The method of claim 1 further comprising updating the derived set of values in real-time by continually aggregating statistical data from the different sets of servers at each recurring interval, by grouping a subset of statistical data for the particular customer configuration at each recurring interval, and by modifying the derived set of values based on newly aggregated statistical data for the particular customer configuration at each recurring interval.

5. The method of claim 4, wherein continually aggregating statistical data comprises aggregating statistical data from different servers of the different sets of servers at different staggered windows in the recurring interval, and wherein modifying the derived set of values comprises incrementally modifying the derived set of values at each window in the recurring interval in which statistical data is aggregated from a server to which the particular customer configuration is deployed.

6. The method of claim 1, wherein each customer configuration of the plurality of customer configurations is deployed to at least one server of the different sets of servers that performs at least one of content distribution and service execution as specified by said customer configuration.

7. The method of claim 1, wherein aggregating statistical data comprises aggregating statistics that a server of the different sets of servers produces for each customer configuration that is deployed to said server.

8. For a distributed platform comprising a plurality of servers that produce statistical data, a reporting system comprising:
   a statistics server communicably coupled to the plurality of servers, said statistics server comprising a processor operating to (i) aggregate said statistical data from the plurality of servers in a staggered manner during a recurring interval and (ii) incrementally update a real-time performance report for a particular customer of the distributed platform as statistical data is aggregated in the staggered manner from edge servers of a first content delivery network (CDN) and edge servers of a second CDN that are simultaneously deployed with a configuration of the particular customer and that produce statistical data for the particular customer as a result of performing at least one of content distribution and service execution on behalf of the particular customer, wherein the plurality of servers comprises the edge servers of the first and second CDNs; and
   a portal server comprising a processor operating to present said performance report to the particular customer as it is derived in real-time.

9. The reporting system of claim 8, wherein said statistics server aggregates said statistical data in the staggered manner by aggregating statistical data from at least a first set of the plurality of servers at a first window of the recurring interval and a second set of the plurality of servers at a second window of the recurring interval, wherein servers in the first set of servers differ from servers in the second set of servers, wherein the first window is a different instance in time in the recurring interval than the second window, and wherein statistical data from all the plurality of servers is aggregated during each recurring time interval.

10. The reporting system of claim 8, wherein the statistics server aggregates the statistical data by pulling the statistical data from the plurality of servers in the staggered manner based on a configuration file that identifies which servers of the plurality of servers to pull statistical data from at different windows of the recurring time interval.

11. The reporting system of claim 8, wherein the statistics server aggregates the statistical data by configuring the plurality of servers with a configuration file that specifies when in the recurring time interval each server of the plurality of servers is to push statistical data to the statistics server.

12. The reporting system of claim 8, wherein said processor of the portal server further operates to maintain an active session with a client of the particular customer in order to pass the performance report to the client as it is updated.

13. The reporting system of claim 12, wherein said processor of the portal server further operates to generate a historic log of the performance report at the client based on passing the performance report to the client as it is updated and causing the client to store a set of previously passed updates for presentation.

14. The reporting system of claim 8 further comprising a database for authenticating the particular customer to identify the performance report that the particular customer is allowed to view when the particular customer accesses the portal server.

15. The reporting system of claim 8, wherein the particular customer is a first customer, the performance report is a first performance report, and the processor of the statistics server further operates to (iii) derive a second performance report for a second customer of the distributed platform based on statistical data that is aggregated from a different set of the plurality of servers that performs at least one of content distribution and service execution on behalf of the second customer and (iv) update said second performance report in real-time as said statistical data is aggregated from each server of the different set of the plurality of servers in the staggered manner during the recurring interval.

16. The reporting system of claim 8, wherein said statistics server and said portal server are operated by at least one of the first CDN and the second CDN.

17. The distributed platform of claim 8, wherein said statistics server and said portal server are operated by a third party independent of the first CDN and the second CDN.

18. A method for providing real-time granular statistics reporting in a distributed platform, the method comprising:
   aggregating at least one data structure from at least one different server of a plurality of servers at different windows within a recurring time interval, wherein said data structure comprises statistical data;
   as each particular data structure is aggregated, processing the statistical data of the particular data structure to incrementally update in real-time at least one value for a performance report that is derived using statistical data that is aggregated from a set of at least two servers at different windows of the recurring time interval, wherein processing the statistical data comprises:
      (i) identifying a particular server from which the particular data structure is aggregated,
      (ii) identifying a current value aggregated from the particular server in a preceding time interval that was used in deriving the value of the performance report,
      (iii) identifying a new value for the current value from the particular data structure,
      (iv) computing a difference between the new value and the current value and summing said difference with the value of the performance report to incrementally update the performance report when the new value is identified and the current value is identified, (v) adding the new value to the value of the performance report to incrementally update the performance report when the new value is identified and the current value is not identified, and (vi) subtracting the current value from the value of the performance report to incrementally update the performance report when the new value is not identified and the current value is identified; and passing the performance report as it is updated in real-time to a client while a connection is maintained with the client.

19. The method of claim 18, wherein aggregating at least one data structure comprises aggregating a data structure that a particular server dynamically populates with different statistical data at different instances of the recurring time interval.

20. The method of claim 19, wherein the particular server dynamically populates the data structure with different statistical data based on statistical data that the particular server produces during a current interval of the recurring time interval.

21. The method of claim 18, wherein passing the updated performance report comprises producing historic trending at the client based on each update of the performance report.

* * * * *